United States Patent
Akahira et al.

(10) Patent No.: US 6,540,346 B1
(45) Date of Patent: Apr. 1, 2003

(54) COLOR FILTER MANUFACTURING APPARATUS AND METHOD, COLOR FILTER, DISPLAY DEVICE, APPARATUS HAVING THE DISPLAY DEVICE, AND METHOD OF REDUCING UNEVENNESS OF DISCHARGE VOLUME IN PLURAL NOZZLES BY INK CIRCULATION

(75) Inventors: Makoto Akahira, Kawasaki (JP); Masaru Kikuchi, Yokohama (JP); Satoshi Wada, Machida (JP); Hiroshi Fujiike, Yokohama (JP); Hiromitsu Yamaguchi, Kawasaki (JP); Yoshitomo Marumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/441,878

(22) Filed: Nov. 17, 1999

(30) Foreign Application Priority Data

Nov. 27, 1998 (JP) .............................. 10-336415
Oct. 28, 1999 (JP) .............................. 11-307530

(51) Int. Cl.[7] ................................. B41J 2/01
(52) U.S. Cl. ...................................... 347/107
(58) Field of Search ............................ 347/1, 19, 89, 347/105, 106, 101, 107; 430/7

(56) References Cited

U.S. PATENT DOCUMENTS

| | | |
|---|---|---|
| 4,313,124 A | 1/1982 | Hara |
| 4,345,262 A | 8/1982 | Shirato et al. |
| 4,459,600 A | 7/1984 | Sato et al. |
| 4,463,359 A | 7/1984 | Ayata et al. |
| 4,558,333 A | 12/1985 | Sugitani et al. |
| 4,608,577 A | 8/1986 | Hori |
| 4,723,129 A | 2/1988 | Endo et al. |

(List continued on next page.)

FOREIGN PATENT DOCUMENTS

| | | |
|---|---|---|
| EP | 0 390 198 | 10/1990 |
| EP | 0 754 553 | 1/1997 |
| EP | 0 756 933 | 2/1997 |
| EP | 0 832 752 | 4/1998 |
| JP | 54-056847 | 5/1979 |
| JP | 59-75205 | 4/1984 |
| JP | 59-123670 | 7/1984 |
| JP | 59-138461 | 8/1984 |
| JP | 60-071260 | 4/1985 |

(List continued on next page.)

Primary Examiner—John Barlow
Assistant Examiner—Michael S Brooke
(74) Attorney, Agent, or Firm—Fitzpatrick, Cella, Harper & Scinto

(57) ABSTRACT

A color filter manufacturing apparatus can manufacture a color filter with less color unevenness in a short period of time. The color filter manufacturing apparatus forms an array of colored portions of a color filter by discharging a plurality of inks from a plurality of discharge orifices at a predetermined density by using an ink-jet head having a plurality of discharge orifices, an ink chamber connected to the plurality of discharge orifices, an ink supply opening for supplying ink to the ink chamber, and an ink exit opening for exiting ink from the ink chamber. The color filter manufacturing apparatus comprises an ink flow generating device for generating a flow of ink from the ink supply opening to the ink exit opening in the ink chamber while discharging ink from the discharge orifices for coloring. The colored portions are formed when a variation rate of ink volume discharged from the plurality of discharge orifices for forming the array of colored portions is ±3% or less.

31 Claims, 28 Drawing Sheets

U.S. PATENT DOCUMENTS

| | | | |
|---|---|---|---|
| 4,740,796 A | | 4/1988 | Endo et al. |
| 5,107,281 A | * | 4/1992 | Takahashi .................... 347/89 |
| 5,140,429 A | | 8/1992 | Ebinuma et al. |
| 5,353,052 A | * | 10/1994 | Suzuki et al. ................. 347/19 |
| 5,670,205 A | | 9/1997 | Miyazaki et al. |
| 5,712,064 A | * | 1/1998 | Miyazaki et al. .............. 430/7 |
| 5,818,485 A | * | 10/1998 | Rezanka ..................... 347/89 |
| 5,847,723 A | | 12/1998 | Akahira et al. |
| 6,158,844 A | | 12/2000 | Murakami et al. |
| 6,158,858 A | | 12/2000 | Fujiike et al. |
| 6,172,693 B1 | | 1/2001 | Minemoto et al. |

FOREIGN PATENT DOCUMENTS

| | | | |
|---|---|---|---|
| JP | 3-5148 | | 1/1991 |
| JP | 09236490 | * | 9/1997 |
| JP | 10-34899 | | 2/1998 |
| JP | 10-67111 | | 3/1998 |
| JP | 10-138515 | | 5/1998 |
| JP | 10-157130 | | 6/1998 |
| JP | 10-244687 | | 9/1998 |
| JP | 10-260306 | | 9/1998 |
| WO | WO 98/19864 | | 5/1998 |

* cited by examiner

- 7 LIGHT-TRANSMITTING PORTION
- 2 BLACK MATRIX
- 1 SUBSTRATE

- 3 RESIN LAYER

- 4 PHOTOMASK
- 5 UNCOLORED PORTION

- INK-JET HEAD

- 8 PROTECTION LAYER

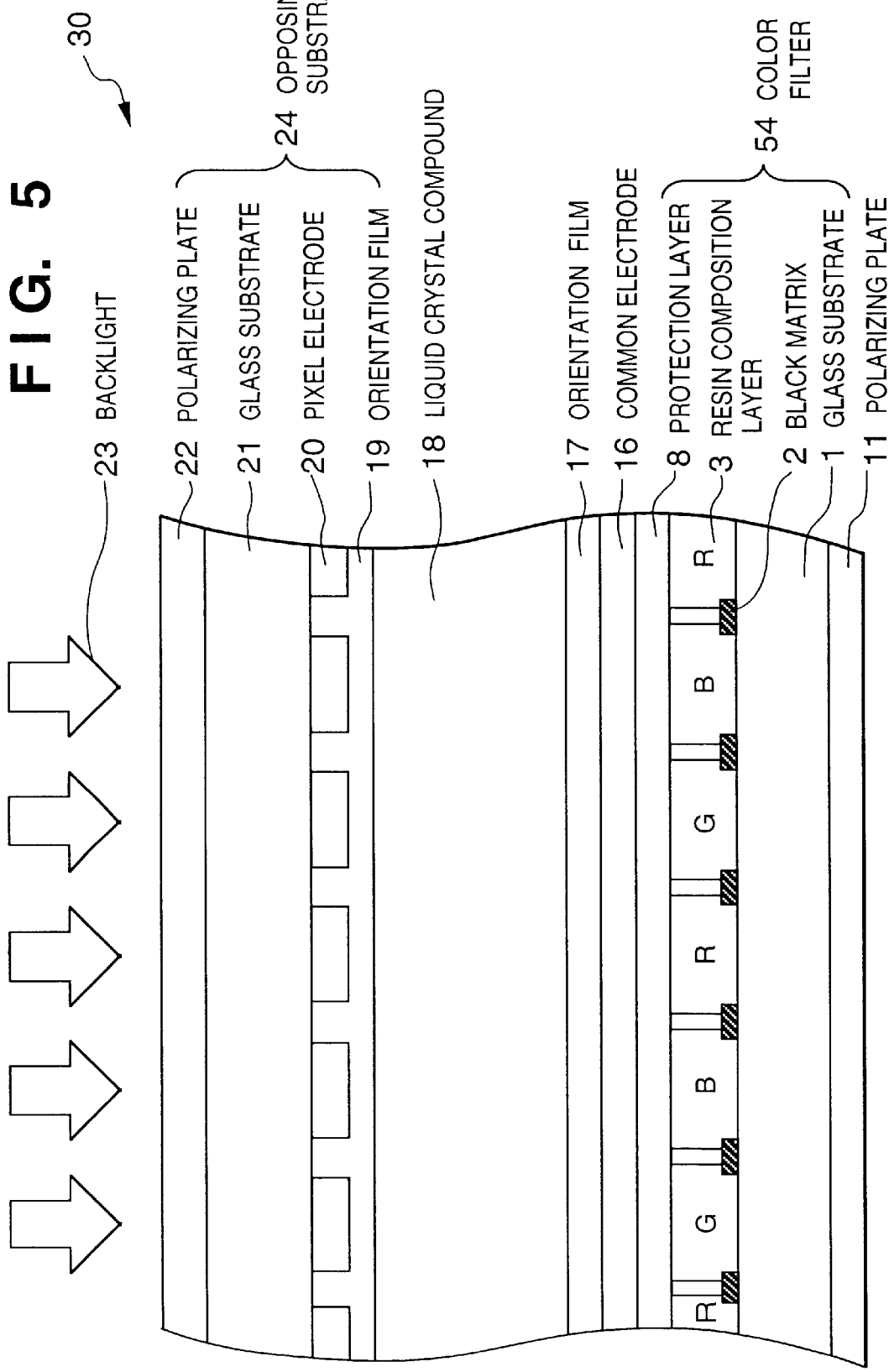

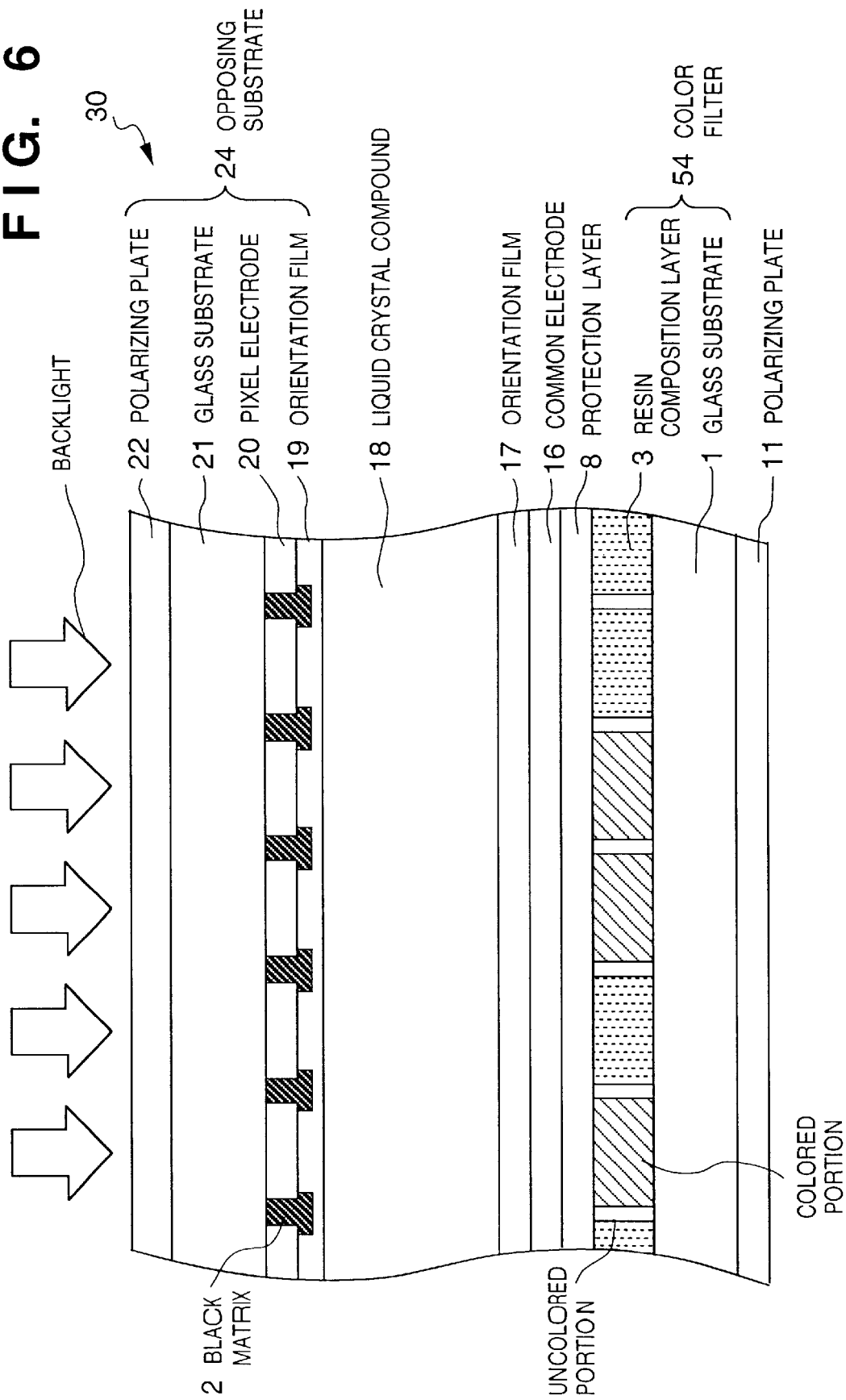

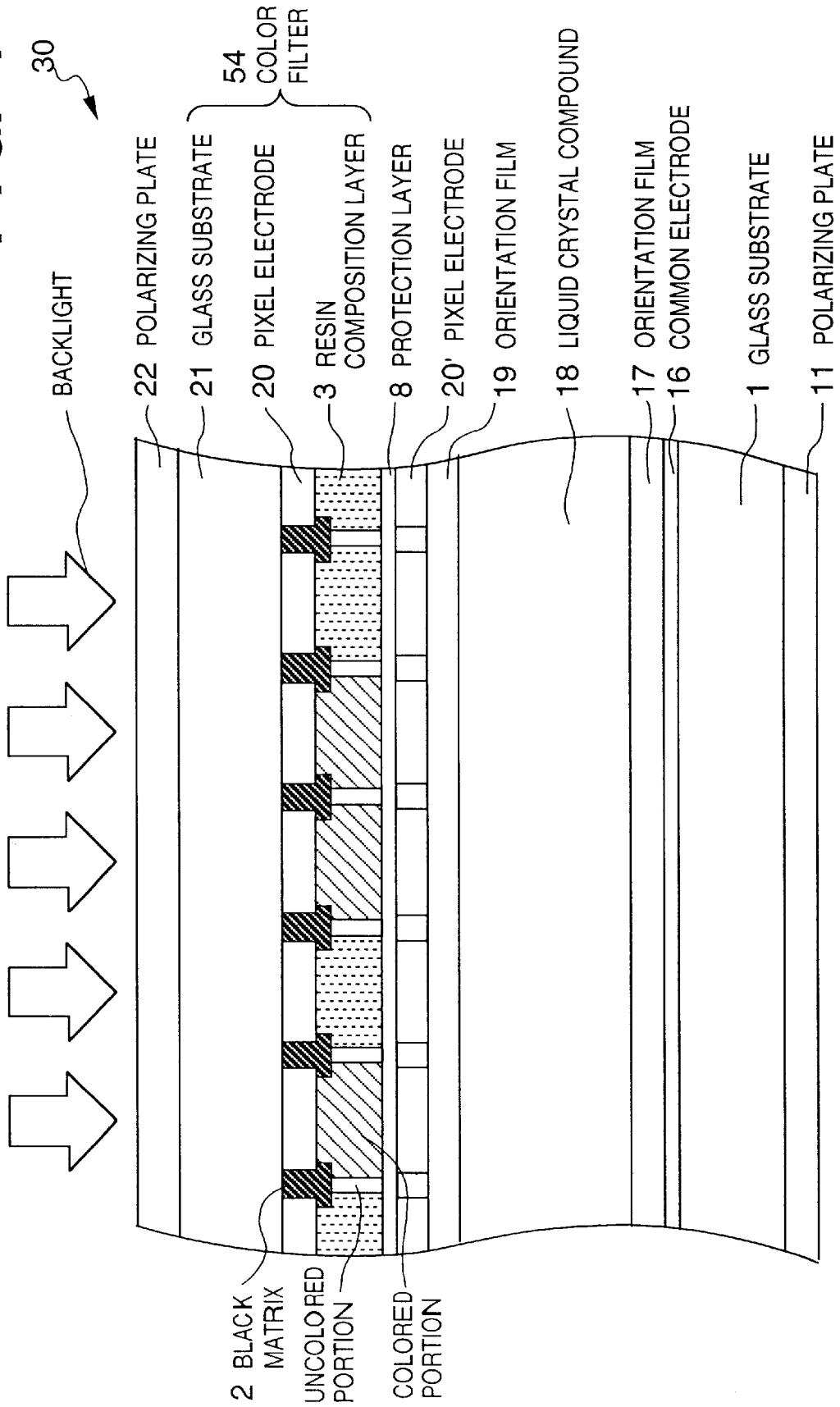

CALIBRATION LINE BETWEEN DENSITY AND DISCHARGE AMOUNT

US 6,540,346 B1

COLOR FILTER MANUFACTURING APPARATUS AND METHOD, COLOR FILTER, DISPLAY DEVICE, APPARATUS HAVING THE DISPLAY DEVICE, AND METHOD OF REDUCING UNEVENNESS OF DISCHARGE VOLUME IN PLURAL NOZZLES BY INK CIRCULATION

BACKGROUND OF THE INVENTION

The present invention relates to a color filter manufacturing apparatus and method for manufacturing a color filter by coloring a color filter substrate by an ink-jet head, a color filter, a display device, an apparatus having the display device, and a method of reducing unevenness of discharge volume in plural nozzles by ink circulation.

A liquid crystal display (LCD) apparatus is employed generally in a personal computer, word processor, pachinko (Japanese pinball) game machine, navigation system in automobiles, small television set or the like, and the demand for LCDs is increasing lately. However, since an LCD is highly priced, cost reduction of an LCD must be achieved.

A color filter which constitutes a liquid crystal display device is formed by arranging red (R), green (G), and blue (B) pixels on a transparent substrate. In order to enhance display contrast, a black matrix for shielding light is provided in the periphery of these pixels.

As a conventional color filter manufacturing method, a pigment dispersion method, dyeing method, electrode position method, and print method are known.

According to the pigment dispersion method, a pigment-dispersed photosensitive resin layer is formed on a glass substrate and patterned into a single-color pattern. This process is repeated three times to obtain R, G, and B color filter layers.

According to the dyeing method, a water-soluble polymer material as a dyeable material is applied onto a glass substrate to form a layer, and the layer is patterned into a desired shape by a photolithographic process. The obtained glass substrate is dipped in a dye bath to obtain a colored pattern. This process is repeated three times to form R, G, and B color filter layers.

According to the electrode position method, a transparent electrode is patterned on a glass substrate, and the resultant glass substrate is dipped in an electrode position coating fluid containing a pigment, a resin, an electrolyte and the like to be colored in a single color by electrode position. This process is repeated three times to form R, G, and B color filter layers. Finally, these layers are calcined.

According to the print method, a pigment is dispersed in a thermosetting resin, a print operation is performed three times to form R, G, and B coatings separately, and the resins are thermoset, thereby forming colored layers.

The process common to these methods is that the same process must be repeated three times to obtain layers colored in three colors, i.e., R, G, and B. Because of the large number of processes, yield of color filters reduces, and the manufacturing cost increases.

Furthermore, in the electrode position method, limitations are imposed on pattern shapes which can be formed. For this reason, with the existing techniques, it is difficult to apply this method to TFTs. Moreover, in the print method, a pattern with a fine pitch is difficult to form because of poor resolution.

In order to compensate for the above drawbacks, a technique for forming a pattern of a color filter on a glass substrate by discharging ink by an ink-jet head has been proposed.

In relation to such ink-jet printing method, for instance, Japanese Patent Laid-Open No. 59-75205 proposes a technique of discharging ink of three colors of pigment R (red), G (green) and B (blue) on a substrate by ink-jet method and drying each ink to form a colored image portion. Such ink-jet method enables formation of pixels colored in R, G and B, all at once. Therefore, the manufacturing process can be greatly simplified and large cost reduction can be attained.

However, according to the color filter manufacturing by ink-jet method, when coloring of each pixel in one column or row of a screen is consecutively performed all at once by an ink-jet head having a large number of ink-discharge nozzles, color unevenness is caused in the screen because of the non-uniform ink discharge amount of the nozzles.

SUMMARY OF THE INVENTION

The present invention is made in consideration of the above situation, and has as its object to provide a color filter manufacturing apparatus and method which enables to manufacture a color filter with less color unevenness in a short period of time.

Another object of the present invention is to provide a color filter manufactured by the above manufacturing method, and a display device having the color filter, and an apparatus having the display device.

In order to overcome the foregoing problems and attain the above objects, a color filter manufacturing apparatus according to a first aspect of the present invention has the following configuration.

More specifically, the present invention provides a color filter manufacturing apparatus for forming an array of colored portions of a color filter by discharging a plurality of inks from a plurality of discharge orifices at a predetermined density by using an ink-jet head having a plurality of discharge orifices, an ink chamber connected to the plurality of discharge orifices, an ink supply opening for supplying ink to the ink chamber, and an ink exit opening for exiting ink from the ink chamber, wherein the colored portions are formed when a variation rate of ink volume discharged from the plurality of discharge orifices for forming the array of colored portions is ±3% or less.

Furthermore, a color filter manufacturing method according to the first aspect of the present invention has the following configuration.

More specifically, the present invention provides a color filter manufacturing method of forming an array of colored portions of a color filter by discharging a plurality of inks from a plurality of discharge orifices at a predetermined density by using an ink-jet head having a plurality of discharge orifices, an ink chamber connected to the plurality of discharge orifices, an ink supply opening for supplying ink to the ink chamber, and an ink exit opening for exiting ink from the ink chamber, wherein the colored portions are formed when a variation rate of ink volume discharged from the plurality of discharge orifices for forming the array of colored portions is ±3% or less.

Furthermore, a color filter according to the first aspect of the present invention has the following configuration.

More specifically, the present invention provides a color filter manufactured by forming an array of colored portions of a color filter by discharging a plurality of inks from a plurality of discharge orifices at a predetermined density by using an ink-jet head having a plurality of discharge orifices, an ink chamber connected to the plurality of discharge orifices, an ink supply opening for supplying ink to the ink chamber, and an ink exit opening for exiting ink from the ink chamber, wherein the colored portions are formed when a variation rate of ink volume discharged from the plurality of discharge orifices for forming the array of colored portions is ±3% or less.

Furthermore, a display device according to the first aspect of the present invention has the following configuration.

More specifically, the present invention provides a display device integrally comprising: a color filter manufactured by forming an array of colored portions of a color filter by discharging a plurality of inks from a plurality of discharge orifices at a predetermined density by using an ink-jet head having a plurality of discharge orifices, an ink chamber connected to the plurality of discharge orifices, an ink supply opening for supplying ink to the ink chamber, and an ink exit opening for exiting ink from the ink chamber; and light-amount changing means for enabling to change an amount of light, wherein the colored portions are formed when a variation rate of ink volume discharged from the plurality of discharge orifices for forming the array of colored portions is ±3% or less.

Furthermore, an apparatus having the display device according to the first aspect of the present invention has the following configuration.

More specifically, the present invention provides an apparatus comprising a display device integrally having: a color filter manufactured by forming an array of colored portions of a color filter by discharging a plurality of inks from a plurality of discharge orifices at a predetermined density by using an ink-jet head having a plurality of discharge orifices, an ink chamber connected to the plurality of discharge orifices, an ink supply opening for supplying ink to the ink chamber, and an ink exit opening for exiting ink from the ink chamber; and light-amount changing means for enabling to change an amount of light; and image-signal supplying means for supplying an image signal to the display device, wherein the colored portions are formed when a variation rate of ink volume discharged from the plurality of discharge orifices for forming the array of colored portions is ±3% or less.

In order to overcome the foregoing problems and attain the above objects, a color filter manufacturing apparatus according to a second aspect of the present invention has the following configuration.

More specifically, the present invention provides a color filter manufacturing apparatus for forming an array of colored portions of a color filter by discharging a plurality of inks from a plurality of discharge orifices at a predetermined density by using an ink-jet head having a plurality of discharge orifices, an ink chamber connected to the plurality of discharge orifices, an ink supply opening for supplying ink to the ink chamber, and an ink exit opening for exiting ink from the ink chamber, comprising: ink flow generating means for generating a flow of ink from the ink supply opening to the ink exit opening in the ink chamber, wherein the ink flow generating means continuously generates the flow of ink during a period of discharging ink from the orifices for coloring and a period of not discharging ink.

Furthermore, a color filter manufacturing method according to the second aspect of the present invention has the following configuration.

More specifically, the present invention provides a color filter manufacturing method of forming an array of colored portions of a color filter by discharging a plurality of inks from a plurality of discharge orifices at a predetermined density by using an ink-jet head having a plurality of discharge orifices, an ink chamber connected to the plurality of discharge orifices, an ink supply opening for supplying ink to the ink chamber, and an ink exit opening for exiting ink from the ink chamber, wherein a flow of ink is continuously generated from the ink supply opening to the ink exit opening in the ink chamber during a period of discharging ink from the orifices for coloring and a period of not discharging ink.

Furthermore, a color filter according to the second aspect of the present invention has the following configuration.

More specifically, the present invention provides a color filter manufactured by forming an array of colored portions of a color filter by discharging a plurality of inks from a plurality of discharge orifices at a predetermined density by using an ink-jet head having a plurality of discharge orifices, an ink chamber connected to the plurality of discharge orifices, an ink supply opening for supplying ink to the ink chamber, and an ink exit opening for exiting ink from the ink chamber, wherein a flow of ink is generated from the ink supply opening to the ink exit opening in the ink chamber during a period of discharging ink from the orifices for coloring and a period of not discharging ink.

Furthermore, a display device according to the second aspect of the present invention has the following configuration.

More specifically, the present invention provides a display device integrally comprising: a color filter manufactured by forming an array of colored portions of a color filter by discharging a plurality of inks from a plurality of discharge orifices at a predetermined density by using an ink-jet head having a plurality of discharge orifices, an ink chamber connected to the plurality of discharge orifices, an ink supply opening for supplying ink to the ink chamber, and an ink exit opening for exiting ink from the ink chamber; and light-amount changing means for enabling to change an amount of light, wherein a flow of ink is generated from the ink supply opening to the ink exit opening in the ink chamber during a period of discharging ink from the orifices for coloring and a period of not discharging ink.

Furthermore, an apparatus having the display device according to the second aspect of the present invention has the following configuration.

More specifically, the present invention provides an apparatus comprising a display device integrally having: a color filter manufactured by forming an array of colored portions of a color filter by discharging a plurality of inks from a plurality of discharge orifices at a predetermined density by using an ink-jet head having a plurality of discharge orifices, an ink chamber connected to the plurality of discharge orifices, an ink supply opening for supplying ink to the ink chamber, and an ink exit opening for exiting ink from the ink chamber; and light-amount changing means for enabling to change an amount of light; and image-signal supplying means for supplying an image signal to the display device, wherein a flow of ink is generated from the ink supply opening to the ink exit opening in the ink chamber during a period of discharging ink from the orifices for coloring and a period of not discharging ink.

In order to overcome the foregoing problems and attain the above objects, a method of reducing unevenness in discharge volume in plural nozzles by ink circulation according to the first aspect of the present invention has the following configuration.

More specifically, the present invention provides a method of reducing unevenness of discharge volume in a plurality of discharge nozzles by ink circulation, in a case of forming an array of colored portions of a color filter by discharging a plurality of inks from a plurality of discharge orifices at a predetermined density by using an ink-jet head having a plurality of discharge orifices, an ink chamber connected to the plurality of discharge orifices, an ink supply opening for supplying ink to the ink chamber, and an ink exit opening for exiting ink from the ink chamber, wherein a flow of ink is generated from the ink supply opening to the ink exit opening in the ink chamber while ink is discharged from the orifices for coloring, and the colored portions are formed when a variation rate of ink volume discharged from the plurality of discharge orifices for forming the array of colored portions is ±3% or less.

Furthermore, a method of reducing unevenness in discharge volume in plural nozzles by ink circulation according to a second aspect of the present invention has the following configuration.

More specifically, the present invention provides a method of reducing unevenness of discharge volume in a plurality of discharge nozzles by ink circulation, in a case of forming an array of colored portions of a color filter by discharging a plurality of inks from a plurality of discharge orifices at a predetermined density by using an ink-jet head having a plurality of discharge orifices, an ink chamber connected to the plurality of discharge orifices, an ink supply opening for supplying ink to the ink chamber, and an ink exit opening for exiting ink from the ink chamber, wherein a flow of ink is generated from the ink supply opening to the ink exit opening in the ink chamber during a period of discharging ink from the orifices for coloring and a period of not discharging ink.

Other objects and advantages besides those discussed above shall be apparent to those skilled in the art from the description of preferred embodiments of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5 is a cross-sectional view showing an example of a basic structure of a color liquid crystal display device incorporating the color filter according to an embodiment of the present invention;

FIG. 6 is a cross-sectional view showing another example of a basic structure of a color liquid crystal display device incorporating the color filter according to an embodiment of the present invention;

FIG. 7 is a cross-sectional view showing another example of a basic structure of a color liquid crystal display device incorporating the color filter according to an embodiment of the present invention;

DETAILED DESCRIPTION OF THE PREFERRED EMBODIMENTS

Preferred embodiments of the present invention will be described in detail in accordance with the accompanying drawings.

Note that a color filter in the present embodiment comprises a colored portion and a body to be colored, wherein light inputted to such coloring filter is outputted with a changed characteristic.

Figure 1:
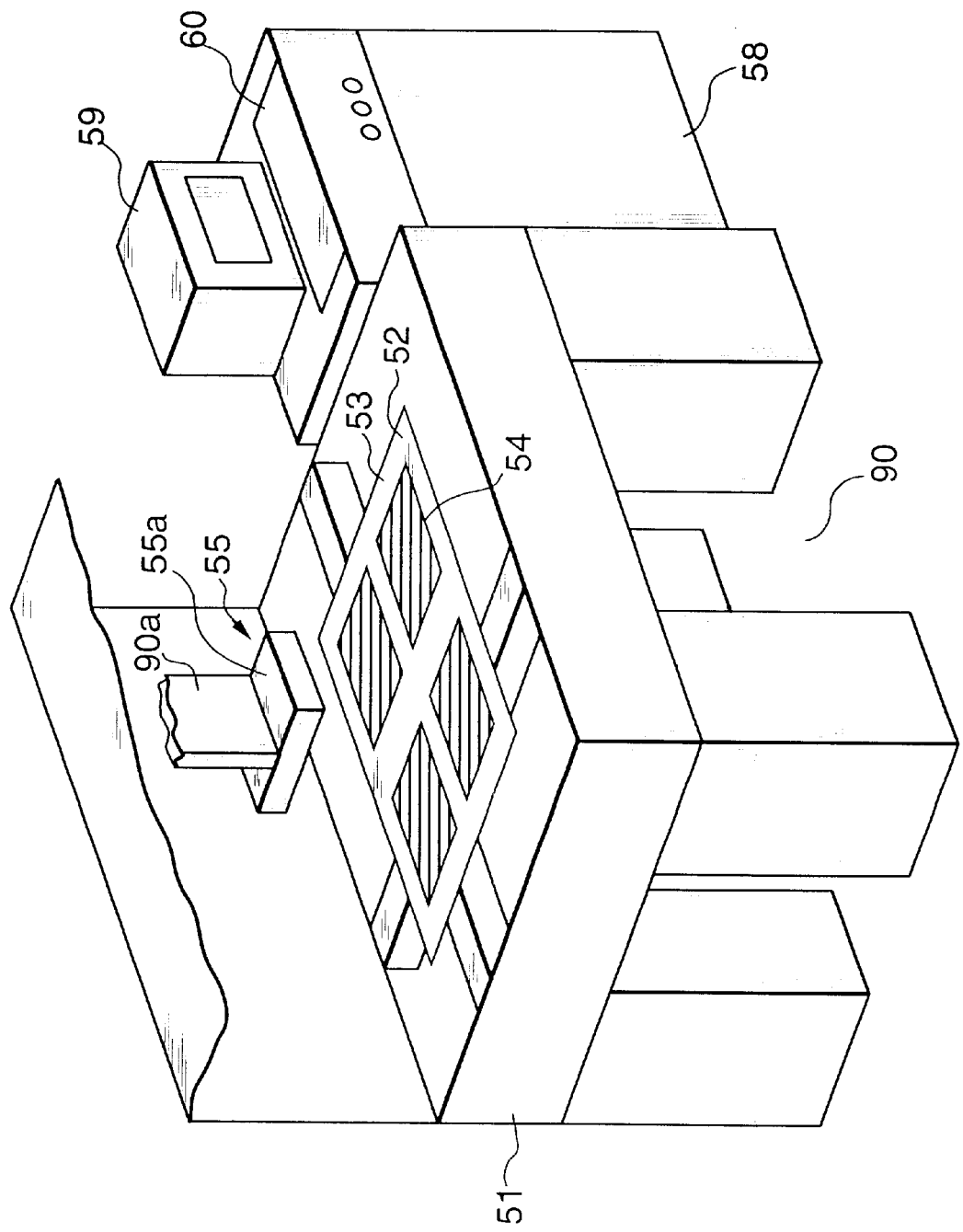
FIG. 1 is a perspective view showing a construction of a color-filter manufacturing apparatus as an embodiment of the present invention.

FIG. 1 is a perspective view showing a construction of a color-filter manufacturing apparatus employing an ink-jet printing method, which is in the middle of coloring operation.

In FIG. 1, reference numeral 51 denotes a platform of the apparatus; 52, an XYθ stage provided on the platform 51; 53, a color-filter substrate set on the XYθ stage 52; 54, a color filter formed on the color-filter substrate 53; 55, a head unit including R (red), G (green) and B (blue) ink-jet heads for coloring the color filter 54 and a head mount 55a supporting these ink-jet heads; 58, a controller which controls the overall operation of a color-filter manufacturing apparatus 90; 59, a display unit of the controller 58; and 60, a keyboard as an operation unit of the controller.

The head unit 55 is detachably mounted to the support portion 90a of the color filter manufacturing apparatus, and the rotation angle of the head unit 55 is adjustable on the horizontal plane.

Figure 2:
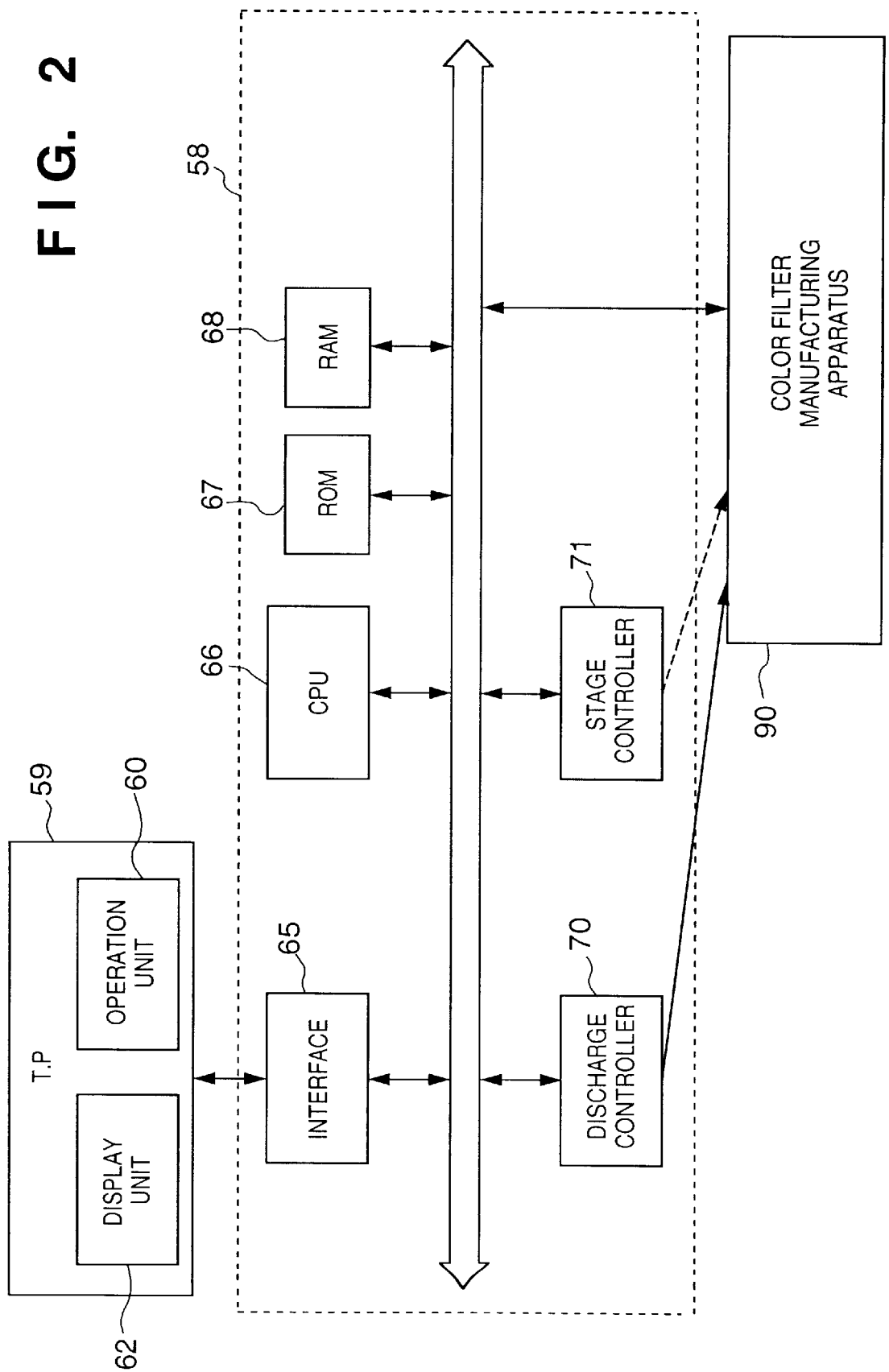
FIG. 2 is a block diagram showing the construction of a controller which controls the operation of the color-filter manufacturing apparatus.

FIG. 2 is a block diagram showing the construction of a controller which controls the operation of the color-filter manufacturing apparatus 90. In FIG. 2, the teaching pendant 59 serves as input/output means of the controller 58. Numeral 62 denotes a display unit which displays information on the progress of manufacturing process, presence/absence of abnormality of the ink-jet head and the like. The keyboard 60 serves as an operation unit for instructing the operation and the like of the color-filter manufacturing apparatus 90.

Reference numeral 58 denotes a controller which controls the overall operation of the color-filter manufacturing apparatus 90; 65, an interface unit for receiving/sending data with respect to the teaching pendant 59; 66, a CPU which controls the color-filter manufacturing apparatus 90; 67, a ROM in which control programs for operating the CPU 66 are stored; 68, a RAM in which error data or the like is stored; 70, a discharge controller which controls ink discharge to respective pixels of a color filter; 71, a stage controller which controls the operation of the XYθ stage 52. The color-filter manufacturing apparatus 90 is connected to the controller 58, and operates in accordance with instructions from the controller 58.

Figure 3:
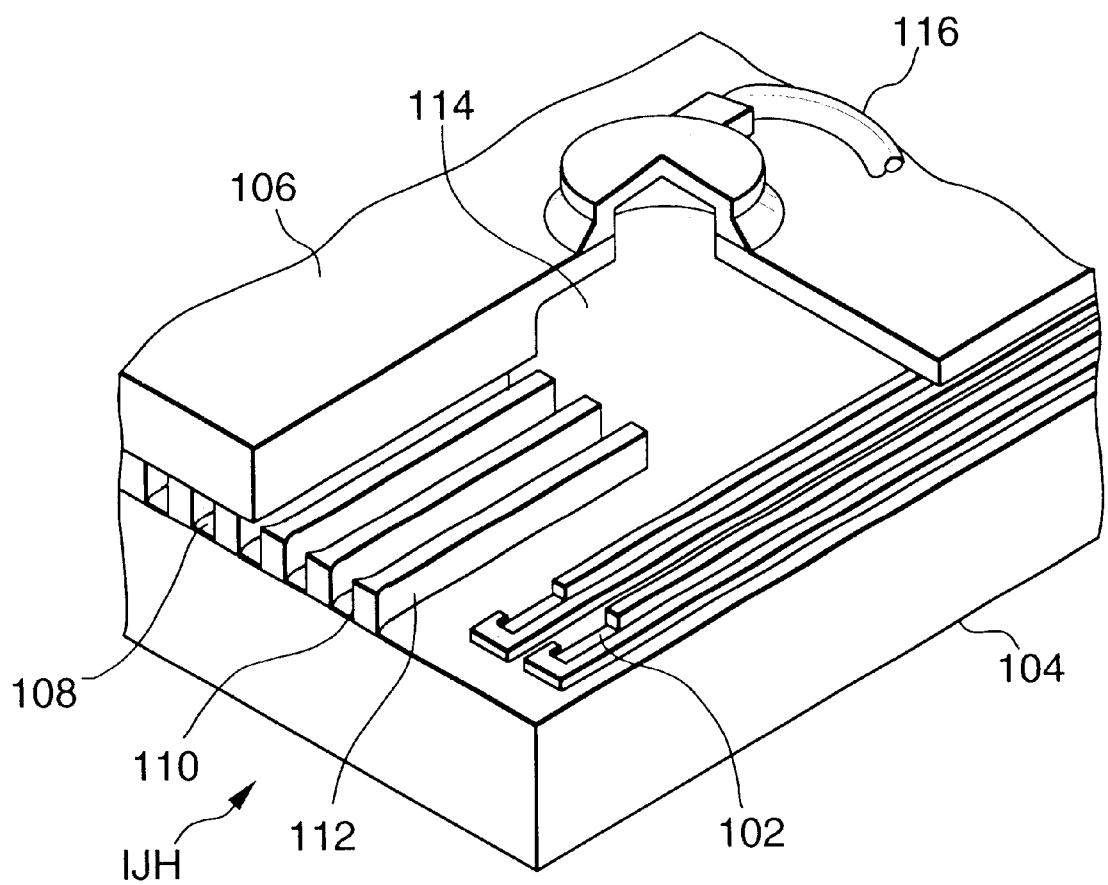
FIG. 3 is a perspective view showing the structure of an ink-jet head used in the color-filter manufacturing apparatus.

FIG. 3 is a perspective view showing the structure of an ink-jet head IJH used in the above color-filter manufacturing apparatus 90. In FIG. 1, the three ink-jet heads are provided in correspondence to the three R, G and B colors; however, as the three heads have the same structure, FIG. 3 shows the structure of one of these heads.

In FIG. 3, the ink-jet head IJH mainly comprises a heater board 104 as a base plate, a plurality of heaters 102 formed on the heater board 104, and a top plate 106 placed on the heater board 104. A plurality of discharge orifices 108 are formed on the top plate 106, and tunnel-like liquid channels 110 connected to the discharge orifices 108 are formed at the rear of the discharge orifices 108. The respective liquid channels 110 are separated from each other by partition walls 112. The liquid channels 110 are connected to a common ink chamber 114 at the rear of the liquid channels. Ink is supplied to the ink chamber 114 via an ink supply port 116, and the ink is supplied from the ink chamber 114 to the respective liquid channels 110.

The heater board 104 and the top plate 106 are assembled such that the respective heaters 102 are positioned correspondingly to the respective liquid channels 110, as shown in FIG. 3. Although FIG. 3 only shows two heaters 102, the heaters 102 are respectively provided in correspondence to the respective liquid channels 110. In the assembled state as shown in FIG. 3, when a predetermined drive pulse is applied to the heaters 102, the ink on the heaters 102 is boiled to form bubbles, and the ink is pressed due to volume expansion of the bubbles and discharged from the discharge orifices 108. Accordingly, the size of the bubbles can be controlled by controlling the drive pulse, e.g., the level of electric power, applied to the heaters 102. Thus, the volume of the ink discharged from the discharge orifices can be freely controlled.

FIGS. 4A to 4F show the process of manufacturing a color filter.

Note that, as a color filter according to the present invention, generally a glass substrate is utilized since a light-transmitting substrate is preferable. However, the present invention is not limited to a glass substrate but may employ other substrates as long as characteristics necessary to serve as a liquid crystal color filter, e.g., transparency, mechanical strength or the like, are satisfied.

Figure 4A:
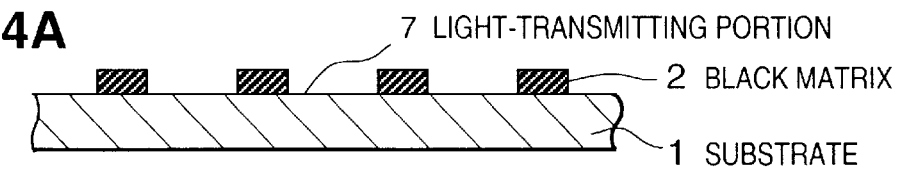
FIGS. 4A to 4F show the process of manufacturing a color filter.
Figure 4B:
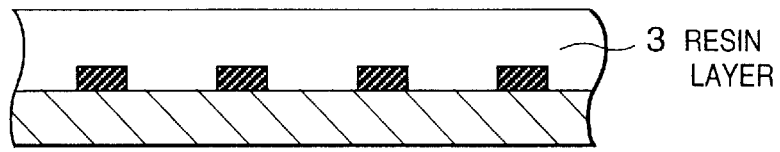
Figure 4C:
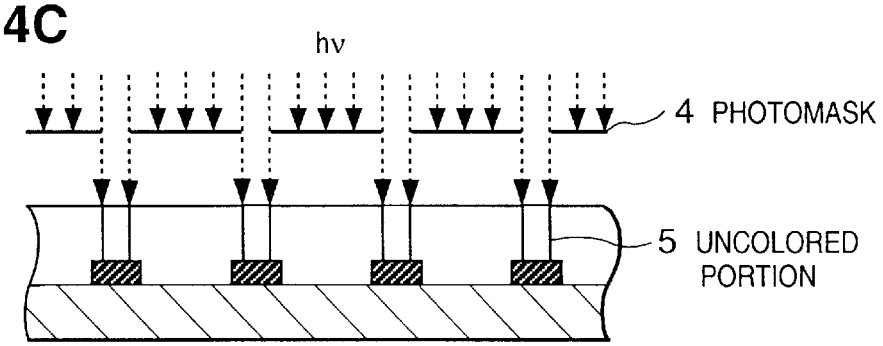
Figure 4D:
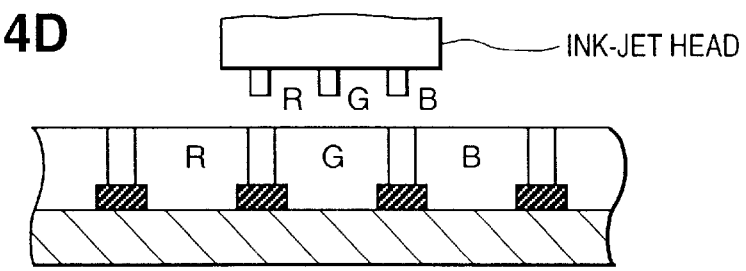
Figure 4E:
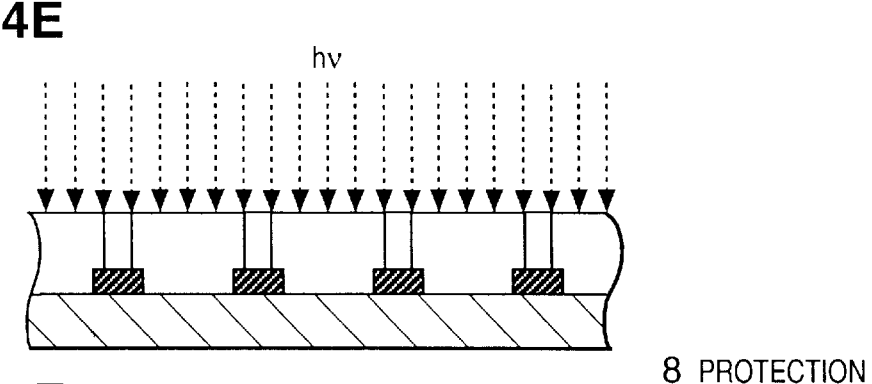

FIG. 4A shows the glass substrate 1 having a light-transmitting portion 7 and a black matrix 2 as a light-shielding portion. First, resin composition, which is set by irradiation of light or a combination of irradiation of light and heating, and which has ink acceptability, is coated on the substrate 1 on which the black matrix 2 is formed, and prebaking is performed in accordance with necessity to form a resin layer 3 (FIG. 4B). The resin layer 3 can be formed by various coating methods such as spin coating, roll coating, bar coating, spray coating and dip coating, and the formation of the resin layer 3 is not limited to any specific method.

Next, a part of the resin layer 3 is set to form a non-absorptive portion 5 (uncolored portion) by performing pattern exposure by utilizing a photomask 4, on the resin layer in advance at a portion light-shielded by the black matrix 2 (FIG. 4C), and a plurality of cells are formed as an ink receiving portion. Then, the plurality of cells are colored all at once with respective R, G and B colors by the ink-jet head (FIG. 4D), and the ink is dried in accordance with necessity.

In the pattern exposure, a photomask 4 having openings for curing the light-shielded portions by the black matrix 2 is employed. At this time, to prevent occurrence of an uncolored portion at a portion which abuts on the black matrix 2, it is necessary to apply a relatively large amount of ink to such portion. For this purpose, the photomask 4 has openings greater than the width (light-shielding width) of the black matrix 2.

As the ink used for coloring, dyes and pigments are both available, and further, both liquid ink and solid ink are available.

As curable resin composition employed in the present invention, any composition can be used as long as it has ink acceptability, and it can be set by at least one of irradiation of light, or heating and light irradiation. For example, resins such as acrylic resins, epoxy resins, silicone resins, cellulose derivatives such as hydroxypropyl cellulose, hydroxyethyl cellulose, methylcellulose, carboxymethyl cellulose or degenerated materials thereof can be employed.

To advance cross-linking reaction by light, or light and heat, a photo-initiator (cross-linking agent) can be employed. As the cross-linking agent, bichromate, bisazide, radical initiator, cationic initiator, anionic initiator and the like can be employed. Further, these photo-initiators can be mixed or they can be combined with other sensitizers. Moreover, a photooxide generator, such as onium salt or the like, may be used in combination as the crosslinking agent.

To further advance the cross-linking reaction, heating processing can be performed after irradiation of light.

The resin layer including the above compositions has excellent thermal resistance and water resistance so as to sufficiently endure high temperature post-process or cleaning process.

As the ink-jet method used in the present invention, a bubble-jet type method using electrothermal transducer as an energy generating element, or a piezo-jet type method using a piezoelectric element can be employed. The size of colored area and the coloring pattern can be arbitrarily set.

Moreover, although the present embodiment shows an example where the black matrix is formed on the substrate, the black matrix may be formed on the resin layer after the curable resin composition layer is formed or after coloring is performed, and the form thereof is not limited to that of the present embodiment. Further, for the forming method of the black matrix, it is preferable that a metal thin film is formed on a substrate by sputtering or deposition method and patterning is performed by photolithography process. However, the forming method is not limited to this.

Figure 4F:
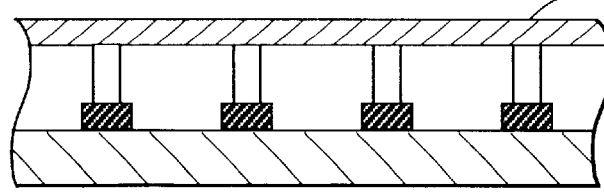

Next, the resin composition is set by irradiation of light only, or heating processing only, or irradiation of light and heating processing (FIG. 4E), and a protective layer 8 is formed in accordance with necessity (FIG. 4F). Note that in FIGS. 4A to 4F, sign hv denotes the intensity of light. In case of heating processing, the resin layer is set by heat instead of light of the intensity hv. The protective layer 8 is formed by using a second resin composition of photo-setting type, heat-setting type or photo- and heat-setting type, or by vapor deposition or sputtering using inorganic material. Any material can be used to form the protective layer 8 as long as it has transparency and sufficient durability at ITO formation process, orientation film formation process and the like performed thereafter.

FIGS. 5 to 7 are cross-sectional views showing the basic structure of a color liquid crystal display device 30 incorporating the above-described color filter.

Generally, the color liquid-crystal display device is formed by assembling the color filter substrate 54 and an opposing substrate 24 and filling liquid crystal compound 18 between them. On the inner surface of the substrate 24, a TFT (Thin Film Transistor) (not shown) and transparent pixel electrodes 20 are formed in matrix. On the inner surface of the other color filter substrate 54, a coloring portion where R, G and B coloring materials are arrayed in the position opposing to the pixel electrodes, is provided, and on top of that, a transparent counter electrode (common electrode) 16 is formed on the entire surface. Generally, the black matrix 2 is formed on the color filter substrate 54 side (see FIG. 5). However, in a case of a BM (black matrix) on-array type liquid crystal panel, the black matrix 2 is formed on the TFT substrate side (opposing substrate 24) opposing to the color filter substrate (see FIG. 6). Further, an orientation film 19 is formed on the surfaces of the both substrates 1 and 21. Liquid-crystal molecules can be oriented in a uniform direction by rubbing processing on the orientation film 19. Further, polarizing plates 11 and 22 are attached to the outer surfaces of the respective glass substrates. The liquid crystal compound 18 is filled in the joint clearance (about 2 to 5 μm) between these glass substrates. As a backlight, the combination of a fluorescent light (not shown) and a light-scattering plate (not shown) is generally used. The liquid-crystal compound functions as an optical shutter to change transmissivity of the backlight, which realizes display.

Furthermore, as shown in FIG. 7, a coloring portion may be formed on the pixel electrodes 20 and may be made to serve as a color filter. In other words, the coloring portion constructing the color filter is not limited to being formed on the glass substrate. Note that the form shown in FIG. 7 includes a case where an ink-accepting layer is formed on the pixel electrodes and ink is discharged on the ink-receiving layer, and a case where resinous ink, into which coloring material is mixed, is directly discharged to the pixel electrodes.

A case where the above liquid crystal display device is applied to an information processing apparatus will be described below with reference to FIGS. 8 to 10.

Figure 8:
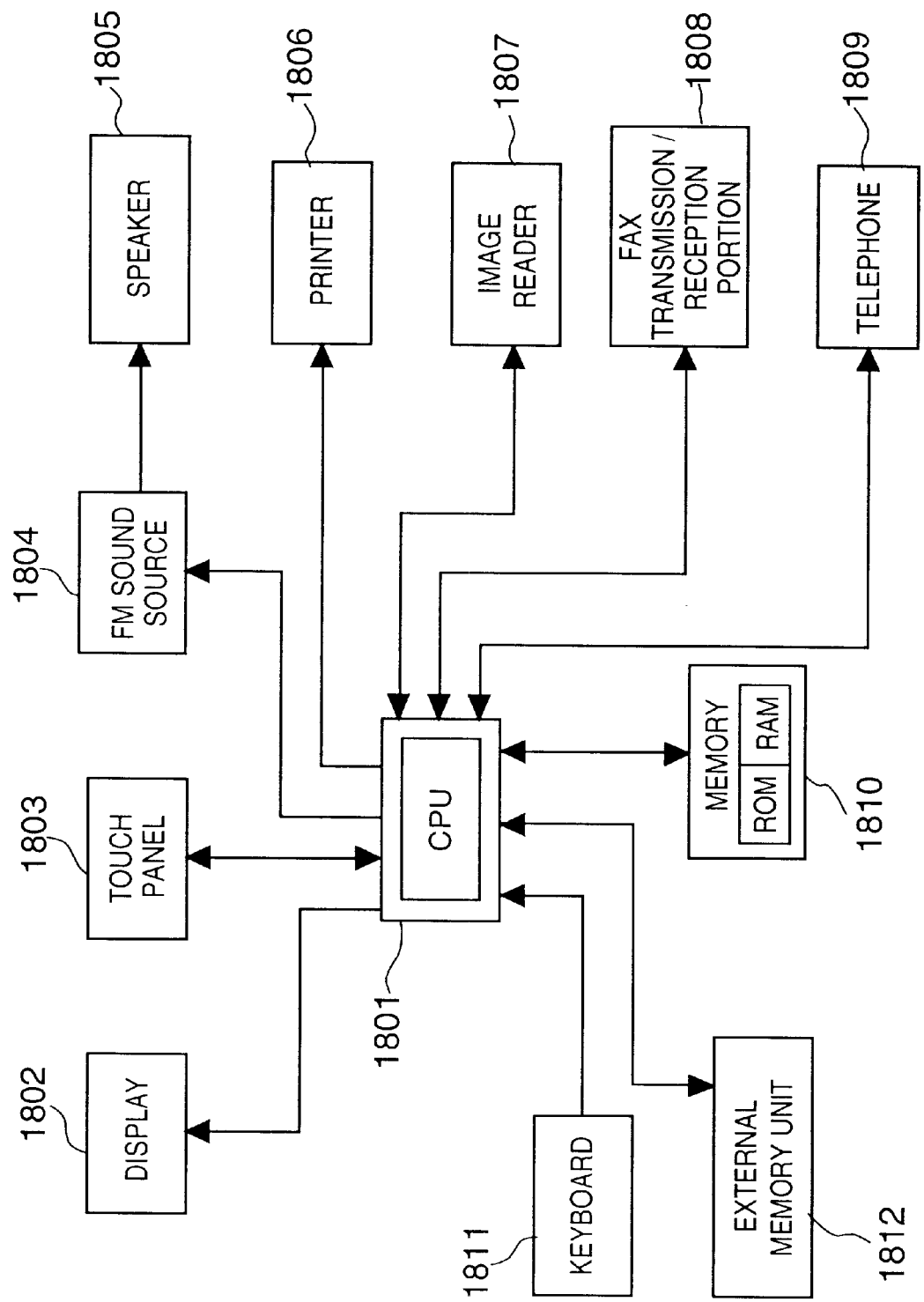
FIG. 8 is a block diagram showing an information processing apparatus to which the liquid crystal display device is applied.

FIG. 8 is a block diagram showing the schematic arrangement of an information processing apparatus serving as a word processor, a personal computer, a facsimile apparatus, and a copying machine, to which the above liquid crystal display device is applied.

Referring to FIG. 8, reference numeral 1801 denotes a control unit for controlling the overall apparatus. The control unit 1801 includes a CPU such as a microprocessor and various I/O ports, and performs control by outputting/inputting control signals, data signals, and the like to/from the respective units. Reference numeral 1802 denotes a display unit for displaying various menus, document information, and image data read by an image reader unit 1807, and the like on the display screen; 1803, a transparent, pressure-sensitive touch panel mounted on the display unit 1802. By pressing the surface of the touch panel 1803 with a finger or the like, an item input operation, a coordinate position input operation, or the like can be performed on the display unit 1802.

Reference numeral 1804 denotes an FM (Frequency Modulation) sound source unit for storing music information, created by a music editor or the like, in a memory unit 1810 or an external memory unit 1812 as digital data, and reading out the information from such a memory, thereby performing FM modulation of the information. Electric signals from the FM sound source unit 1804 are converted into audible sound by a speaker unit 1805. A printer unit 1806 is used as an output terminal for a word processor, a personal computer, a facsimile apparatus, and a copying machine.

Reference numeral 1807 denotes an image reader unit for photoelectrically reading original data. The image reader unit 1807 is arranged midway along the original convey passage and designed to read originals for facsimile and copy operations, or other various originals.

Reference numeral 1808 denotes a transmission/reception unit for the facsimile (FAX) apparatus. The transmission/reception unit 1808 transmits original data read by the image reader unit 1807 by facsimile, and receives and decodes facsimile signals. The transmission/reception unit 1808 has an interface function for external units. Reference numeral 1809 denotes a telephone unit having a general telephone function and various telephone functions such as an answering function.

Reference numeral 1810 denotes a memory unit including a ROM for storing system programs, manager programs, application programs, fonts, and dictionaries, a RAM for storing an application program loaded from the external memory unit 1812 and document information, a video RAM, and the like.

Reference numeral 1811 denotes a keyboard unit for inputting document information and various commands.

Reference numeral 1812 denotes an external memory nit using a floppy disk, a hard disk, and the like. The external memory unit 1812 serves to store document information, music and speech information, application programs for the user, and the like.

Figure 9:
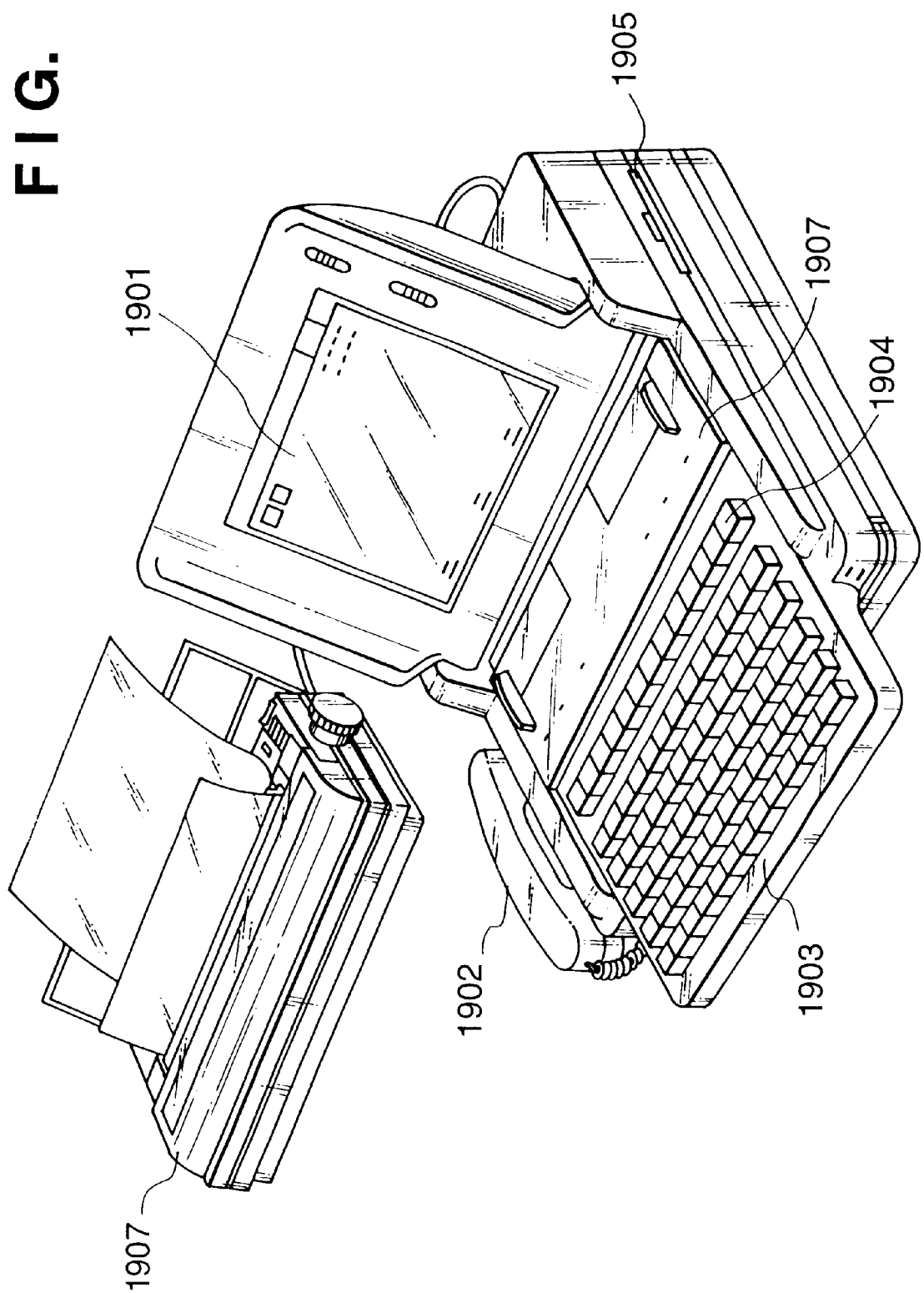
FIG. 9 is a perspective view showing an information processing apparatus to which the liquid crystal display device is applied.

FIG. 9 is a perspective view of the information processing apparatus in FIG. 8.

Referring to FIG. 9, reference numeral 1901 denotes a flat panel display using the above liquid crystal display device, which displays various menus, graphic pattern information, document information, and the like. A coordinate input or item designation input operation can be performed on the flat panel display 1901 by pressing the surface of the touch panel 1803 with a finger of the user or the like. Reference numeral 1902 denotes a handset used when the apparatus is used as a telephone set. A keyboard 1903 is detachably connected to the main body via a cord and is used to perform various document functions and input various data. This keyboard 1903 has various function keys 1904. Reference numeral 1905 denotes an insertion port through which a floppy disk is inserted into the external memory unit 1812.

Reference numeral 1906 denotes an original insertion table on which an original to be read by the image reader unit 1807 is placed. The read original is discharged from the rear portion of the apparatus. In a facsimile receiving operation or the like, received data is printed by an ink-jet printer 1907.

In a case where the above information processing apparatus serves as a personal computer or a word processor, various kinds of information input through the keyboard unit 1811 are processed by the control unit 1801 in accordance with a predetermined program, and the resultant information is output, as an image, to the printer unit 1806.

In a case where the information processing apparatus serves as a receiver of the facsimile apparatus, facsimile information input through the transmission/reception unit 1808 via a communication line is subjected to reception processing in the control unit 1801 in accordance with a predetermined program, and the resultant information is outputted, as a received image, to the printer unit 1806.

In a case where the information processing apparatus serves as a copying machine, an original is read by the image reader unit 1807, and the read original data is output, as an image to be copied, to the printer unit 1806 via the control unit 1801. Note that in a case where the information processing apparatus serves as a transmitter of the facsimile apparatus, original data read by the image reader unit 1807 is subjected to transmission processing in the control unit 1801 in accordance with a predetermined program, and the resultant data is transmitted to a communication line via the transmission/reception unit 1808.

Figure 10:
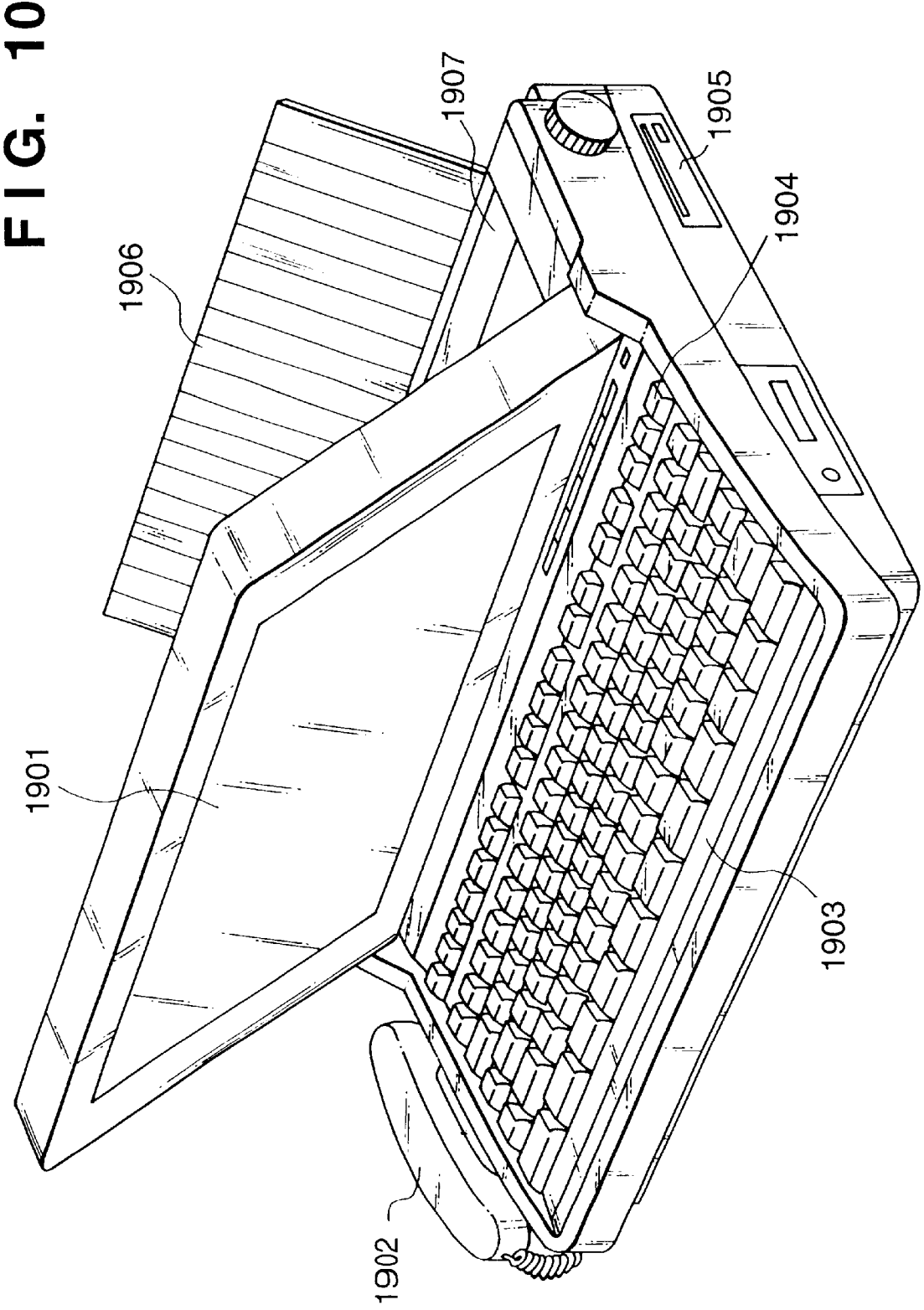
FIG. 10 is a perspective view showing an information processing apparatus to which the liquid crystal display device is applied.

Note that the above information processing apparatus may be designed as an integrated apparatus incorporating an ink-jet printer in the main body, as shown in FIG. 10. In this case, the portability of the apparatus can be improved. The reference numerals in FIG. 10 denote parts having the same functions as those in FIG. 9.

Figure 11:
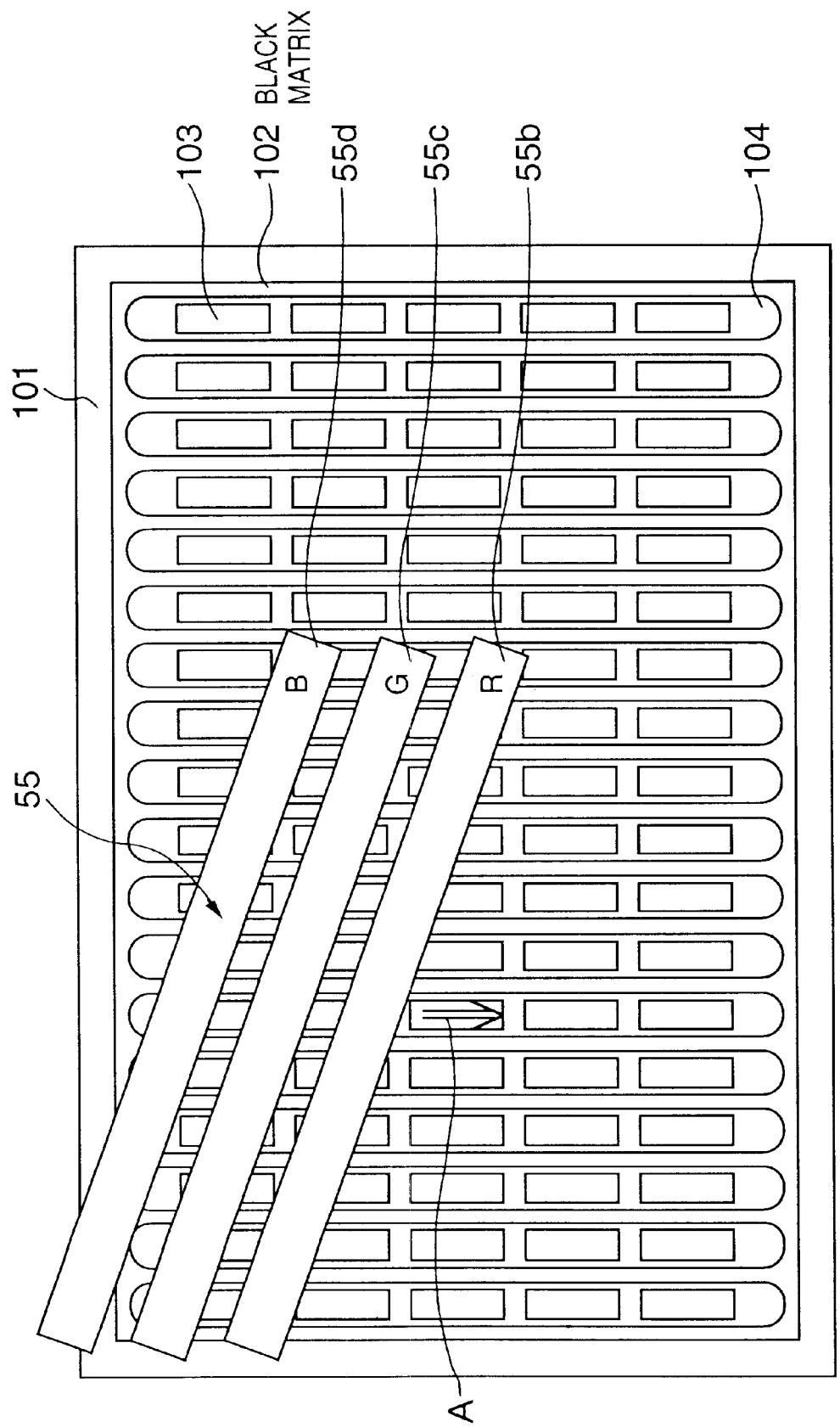
FIG. 11 is a brief illustration of a method of coloring a color filter.

FIG. 11 illustrates a coloring method of a color filter, and shows a top view of one of the color filters formed on the substrate in FIG. 1.

Figure 12:
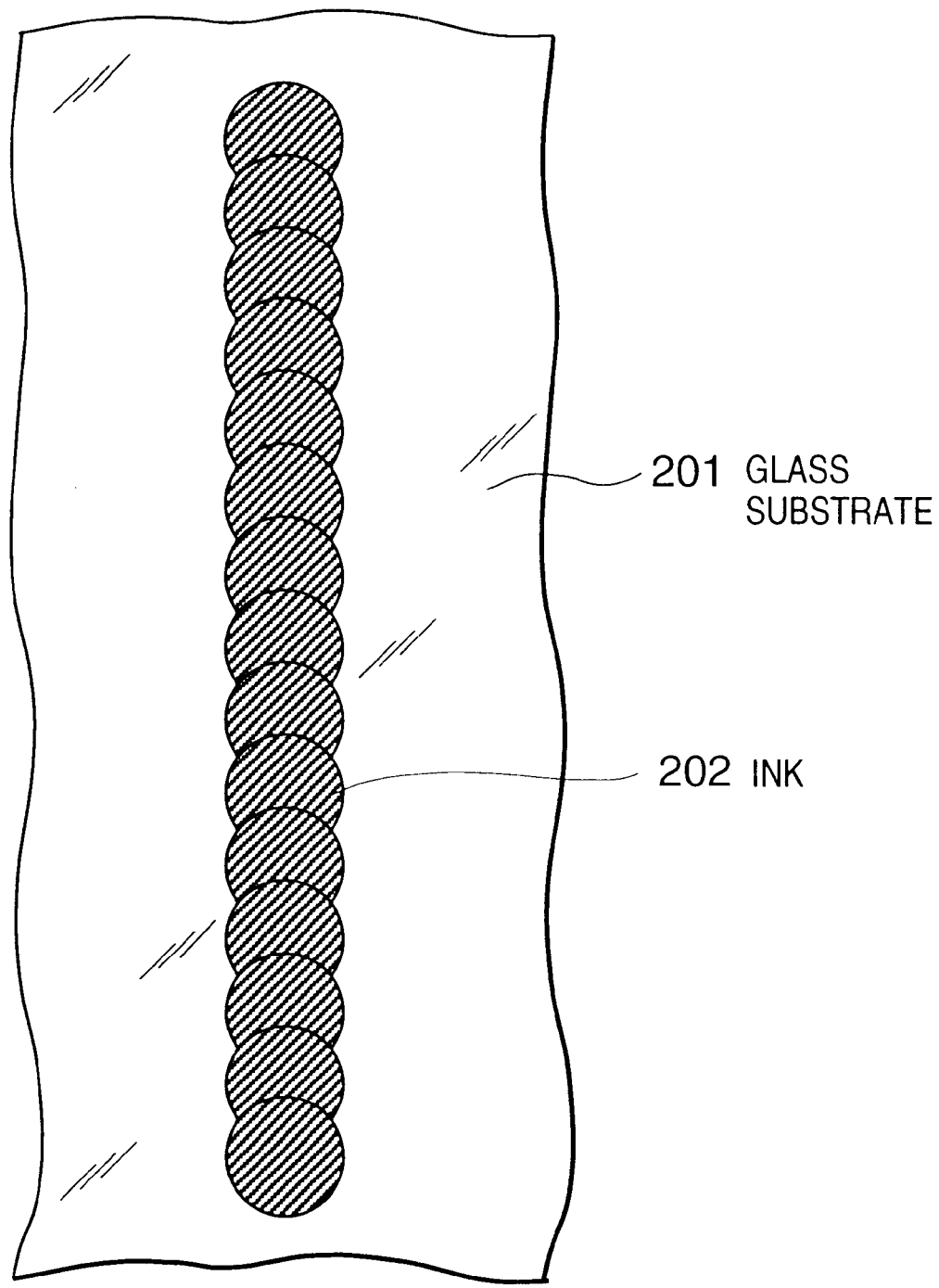
FIG. 12 is an explanatory view of a coloring portion of a color filter which has been colored.

Each component in FIG. 11 is now described from the bottom layer. Reference numeral 101 denotes a color filter substrate (corresponding to the substrate 1 in FIG. 4), and 102 denotes a black matrix (corresponding to the black matrix 2 in FIG. 4), formed on the color filter substrate 101 and having a light-shielding characteristic. Reference numeral 103 denotes an opening (corresponding to the light-transmitting portion 7 in FIG. 4) provided on the black matrix 102. On the black matrix 102, an ink applying layer (corresponding to the resin layer 3 in FIG. 4) is formed, which is subjected to coloring with ink. The ink applying layer includes a striped water-repellent portion (corresponding to the uncolored portion 5 in FIG. 4) between the laterally neighboring openings of the black matrix 102, wherein the striped portion is formed by irradiating ultraviolet ray. Reference numeral 104 denotes a coloring portion of the ink applying layer, wherein ink droplets 202 discharged on the ink applying layer are mixed with each other as shown in FIG. 12 and spread to the area 104 shown in FIG. 11. Reference numeral 55 denotes an ink-jet head unit for coloring a color filter shown in FIG. 1, which comprises ink-jet heads 55*b*, 55*c* and 55*d* for respective colors (red (R), green (G), and blue (B)). The ink-jet heads 55*b*, 55*c* and 55*d* respectively have a plurality of nozzles (not shown) in the longitudinal direction, and are arranged at an angle on a plane which is parallel to the substrate 101 in a way that the nozzle pitch matches the pixel pitch. The ink-jet head unit 55 discharges ink while being scanned relatively to the substrate 101 in the direction of arrow A, thereby coloring each pixel array.

The inventors of the present invention have discovered that, when performing the foregoing coloring with an elongated ink-jet head having a large number (e.g., 1408) of ink discharge nozzles, the amount of ink discharged from the central portion of the ink-jet head decreases as the consecutive coloring operation is repeated.

Figure 13:
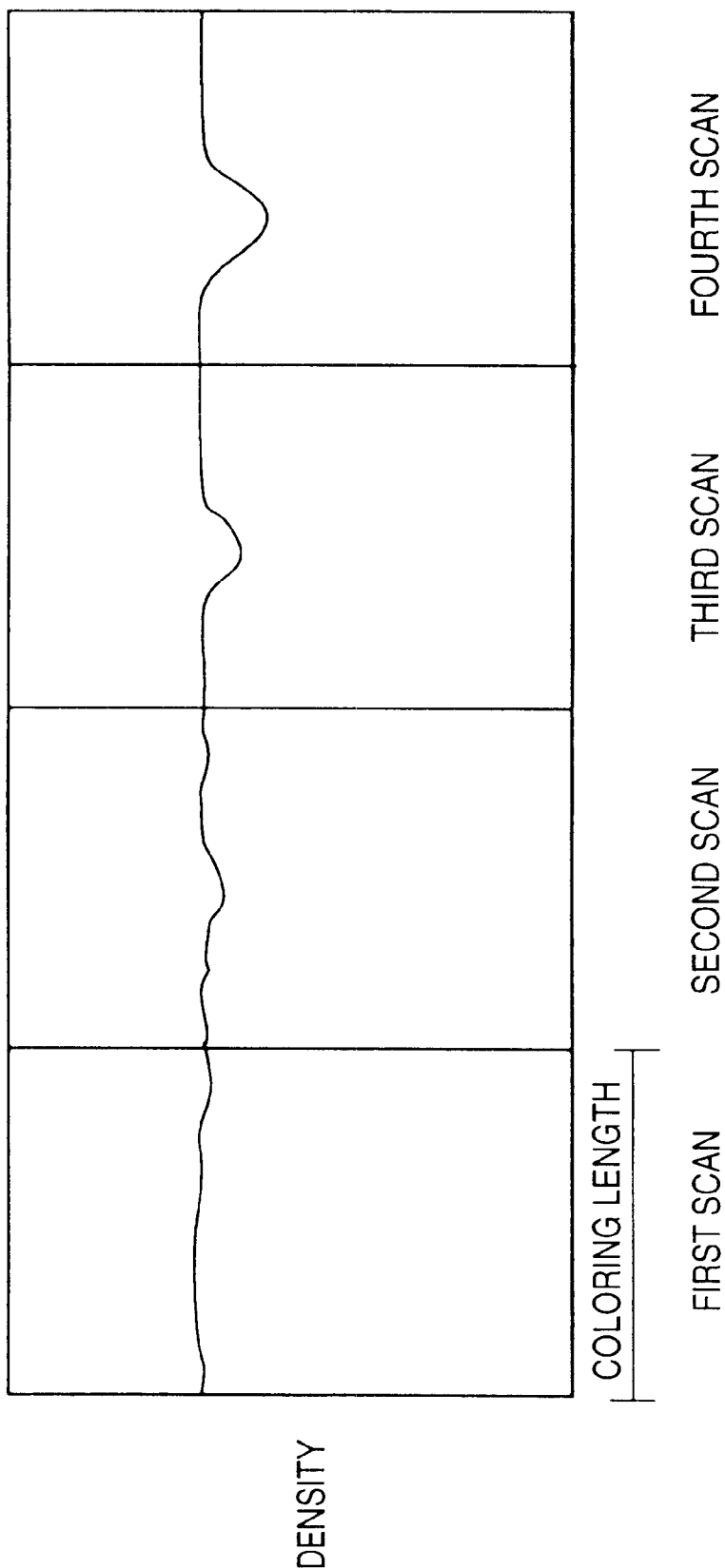
FIG. 13 is a graph demonstrating occurrence of color unevenness in a color filter after each scan.

FIG. 13 represents the above phenomenon. As the coloring operation by scanning is repeated, the color density of the color filter, colored by the central nozzles of the ink-jet head, decreases. Note that this experiment employs an ink-jet head 300 (FIGS. 14A and 14B) having ink supply openings 306 and 308 at both ends of the ink chamber 304 which is formed in an elongated form so as to correspond to the plurality of ink discharge nozzles 302.

Figure 14:
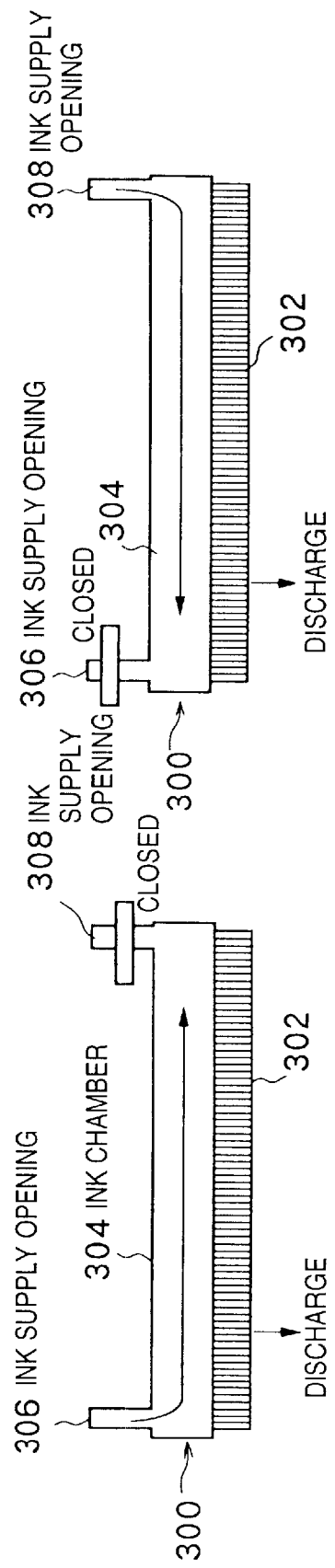
FIGS. 14A and 14B show a brief structure of an ink-jet head.

To clarify the cause of the decreased ink discharge amount in the central portion of the ink-jet head, an experiment was implemented by closing one of the two ink supply openings as shown in FIGS. 14A and 14B, and repeatedly performing consecutive ink discharge operations, then recording the ink discharge amount. FIG. 14A shows the state where the ink supply opening 308 provided on the right was closed, while FIG. 14B shows the state where the ink supply opening 306 provided on the left was closed.

Figure 15:
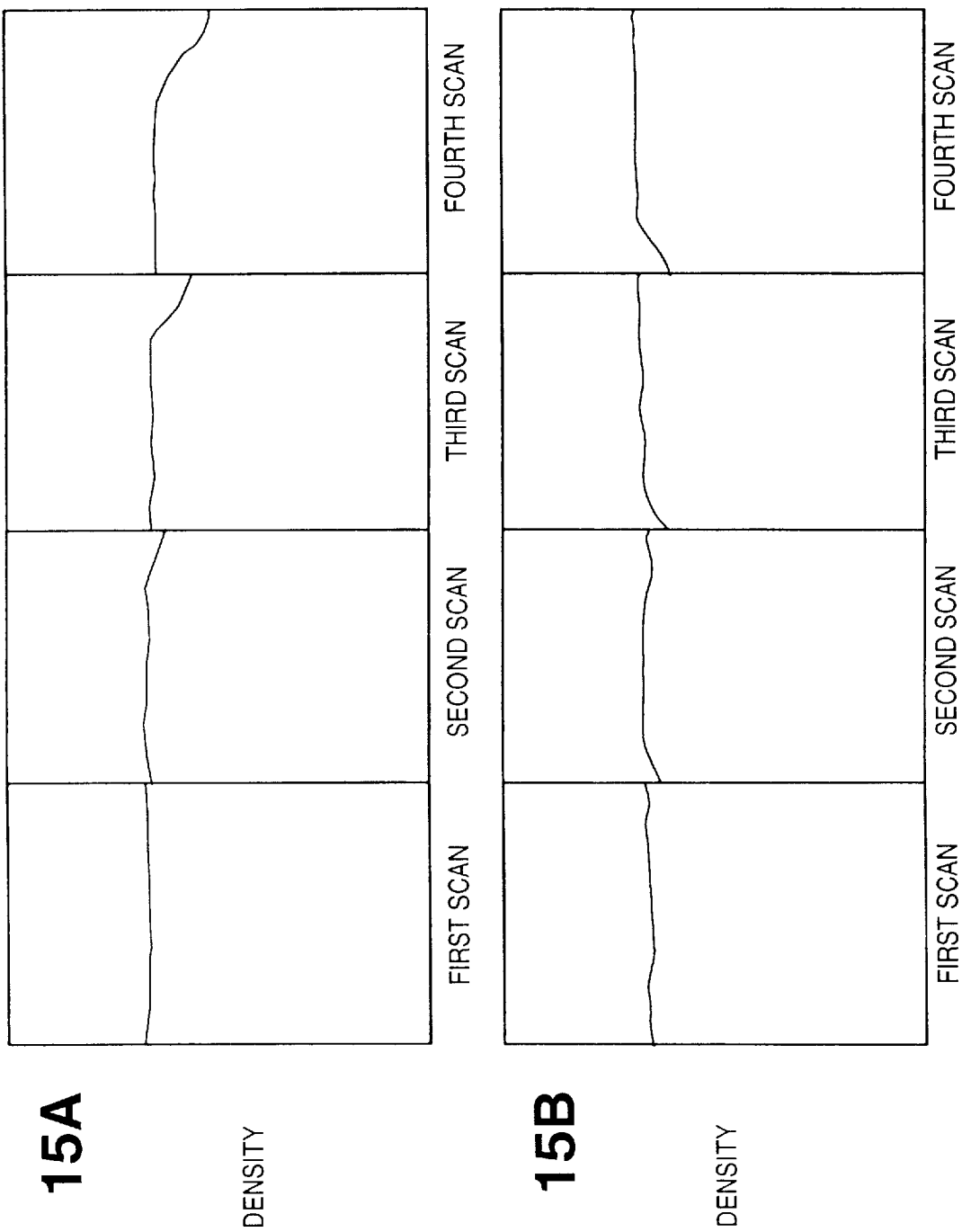
FIGS. 15A and 15B are graphs demonstrating occurrence of color unevenness in a color filter after each scan.
Figure 16:
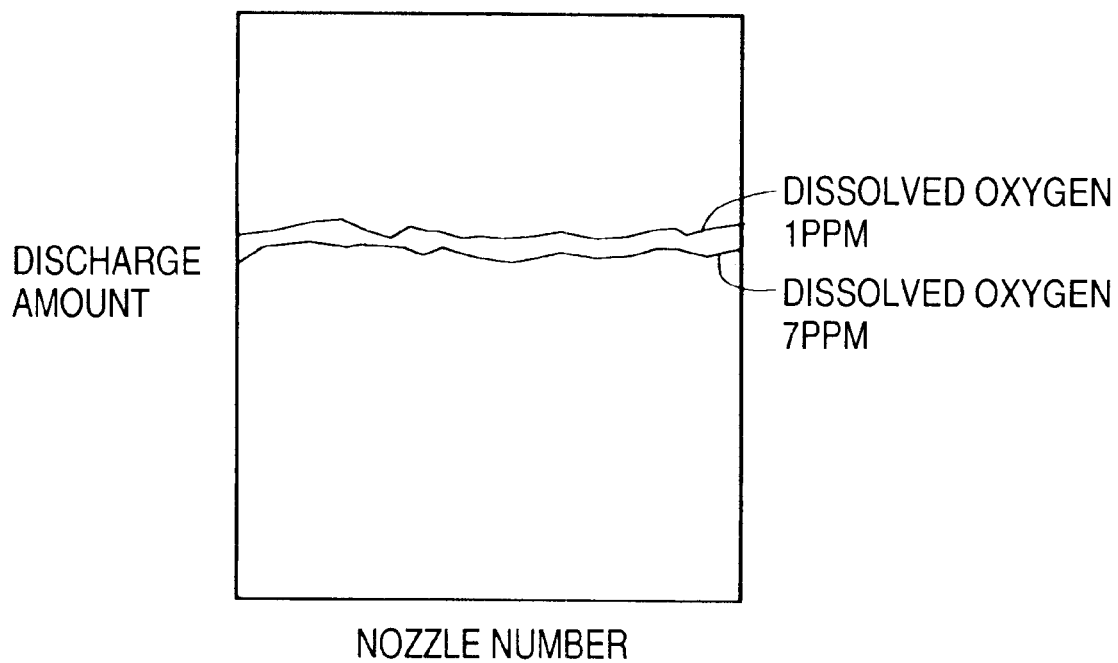
FIG. 16 is a graph showing a relation of how the amount of dissolved oxygen and the ink discharge amount vary.

FIGS. 15A and 15B are graphs demonstrating the decreasing ink discharge amount in the experiment.

When the ink supply opening 308 provided on the right was closed, as shown in FIG. 15A, the amount of ink discharged from ink discharge nozzles near the closed ink supply opening 308 provided on the right was decreased as the coloring operation by scanning is repeatedly performed. Meanwhile, when the ink supply opening 306 provided on the left was closed, as shown in FIG. 15B, the amount of ink discharged from ink discharge nozzles near the closed ink supply opening 306 was decreased.

Note that in the experiment, in order to improve ink discharge stability, the ink discharge was performed while maintaining the amount of dissolved oxygen in the ink to 1 ppm or less. The experiment employed the aforementioned ink-jet head having ink supply openings at both ends of the ink chamber, wherein the number of nozzles is 1408 and the head length is about 100 mm.

Furthermore, this experiment conducted by the inventors of the present invention has also verified that the ink discharge amount is more likely to decrease when using ink having amount of dissolved oxygen of about 7 ppm than using ink having amount of dissolved oxygen of 1 ppm or less.

As a result of the above experiment, the inventors of the present invention assume the following phenomenon.

Figure 17A:
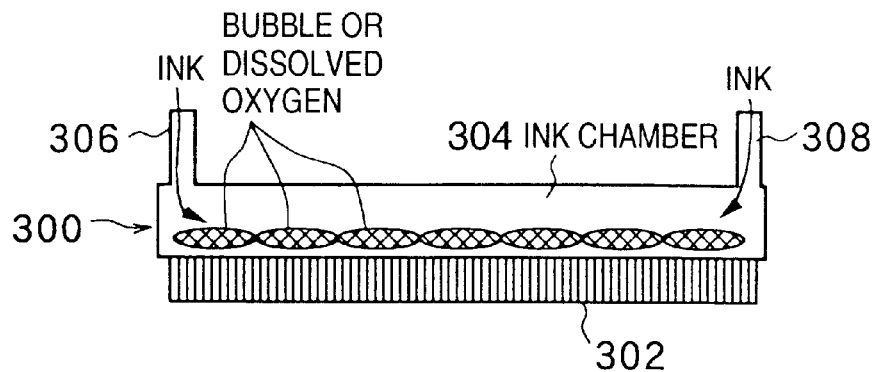
FIGS. 17A–17C are illustrative views showing accumulation of residual bubbles in an ink chamber.
Figure 17B:
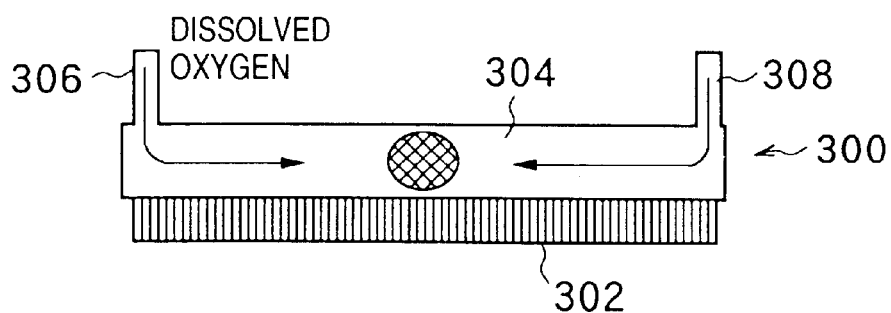

More specifically, as ink discharge is repeated, residual micro bubbles generated by ink discharge (foaming) or ink whose dissolved oxygen is partially increased is accumulated in the ink chamber 304 as shown in FIG. 17A. When ink is refilled from both supply openings 306 and 308 to compensate for discharged ink, the flow of refilled ink collide in the central portion of the ink chamber 304 as shown in FIG. 17B, leaving the residual micro bubbles or ink having increased dissolved oxygen in the central portion of the ink chamber.

In the so-called bubble-jet type ink-jet head shown in FIG. 3 in which ink is discharged by the volume expansion of bubbles generated by heating ink, foaming force propagates in the ink as a shock wave. In this stage, if the amount of dissolved oxygen is large, the dissolved oxygen is deposited and residual micro bubbles become a damper, and as a result, the foaming force is absorbed instead of being propagated, and transmission efficiency is decreased. Because of this, when residual micro bubbles or ink having increased dissolved oxygen is accumulated in the central portion of the ink chamber 304, the ink discharge amount from the central portion of the ink discharge nozzles is decreased.

Figure 17C:
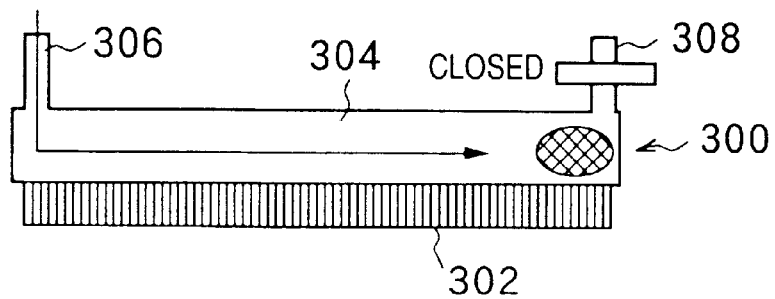
Figure 18:
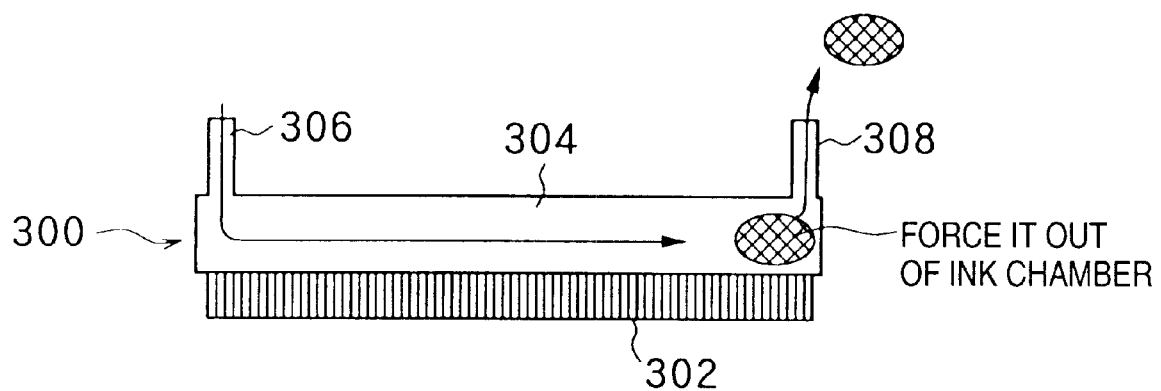
FIG. 18 is an illustrative view showing circulation of ink in the ink chamber.

On the other hand, as shown in FIG. 17C, when the ink supply opening 308 is closed, ink is refilled from the ink supply opening 306 to compensate for discharged ink. By this, the ink flow as indicated by an arrow in FIG. 17C is generated in the ink chamber 304, and residual micro bubbles or ink whose dissolved oxygen is partially increased is accumulated near the closed ink supply opening 308. Because of this, the amount of ink discharged from nozzles near the closed ink supply opening 308 decreases, and as a result, the color density of the color filter colored by the nozzles near the ink supply opening 308 decreases as shown in FIG. 15A.

In order to solve the above problem, according to the present embodiment, ink is circulated at low speed from the ink supply opening 306 to the other ink supply opening 308 in the ink chamber 304 during coloring of a color filter so as to force out of the ink chamber 304, the residual micro bubbles or ink with dissolved oxygen partially increased. By this, the present embodiment enables stabilizing ink discharge over a long period of time.

Figure 19:
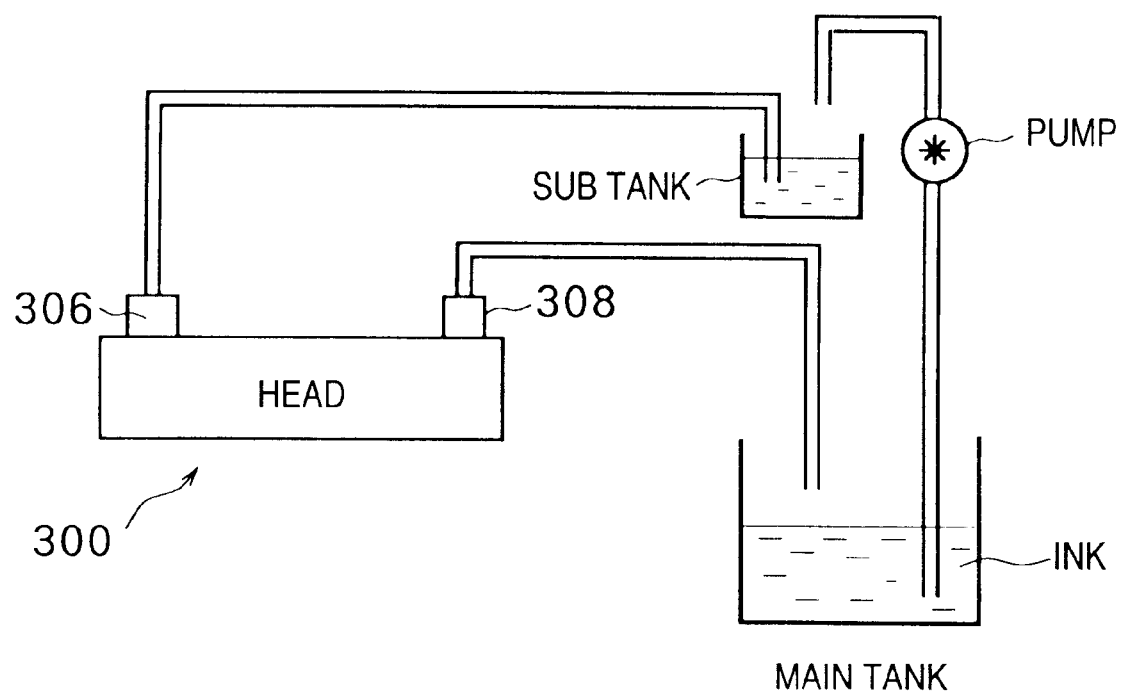
FIG. 19 is an illustrative view showing a structure for circulating ink in the ink chamber.
Figure 20:
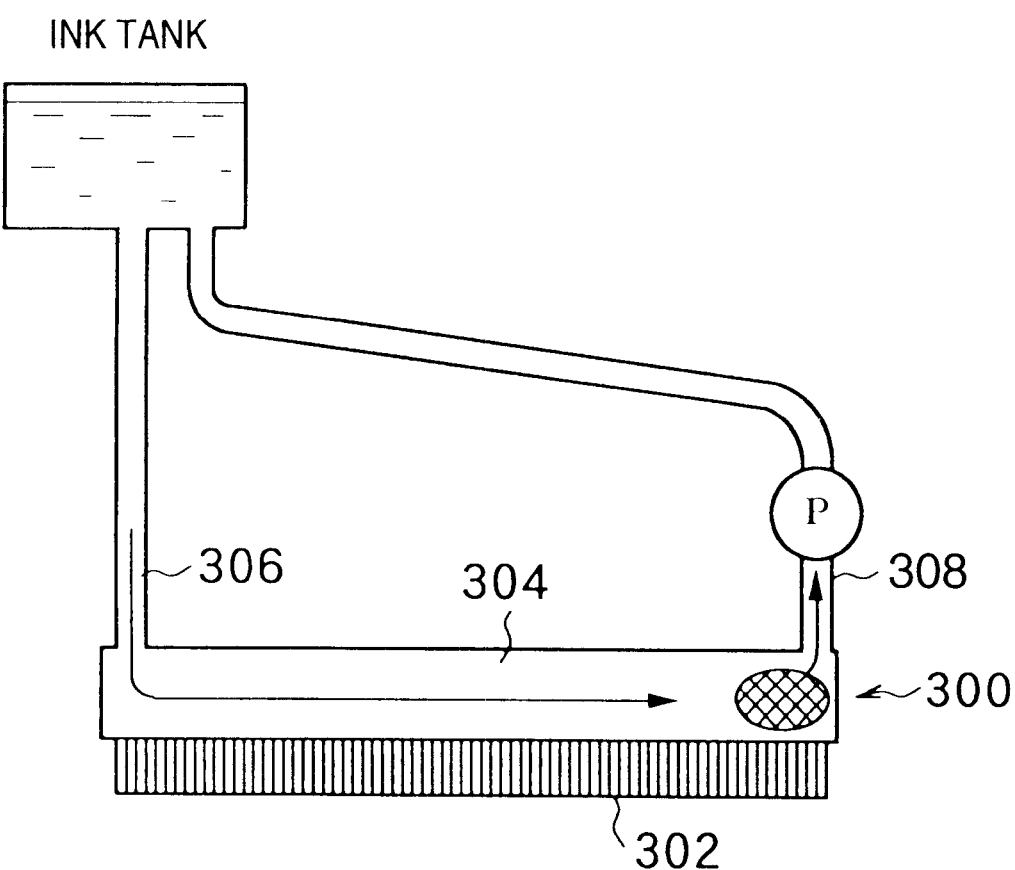
FIG. 20 is an illustrative view showing a structure for circulating ink in the ink chamber.

To circulate ink, the aforementioned experiment used a method shown in FIG. 19 in which an ink sub tank is arranged at a position higher than the ink-jet head 300 and the height difference is used to supply ink to the ink chamber, and a method shown in FIG. 20 in which ink is supplied by a turbine pump such that the ink does not drip from the nozzle. Although the ink flow rate is about 0.2–6 cc/minute, it is preferable to set the flow rate so that the entire ink in the ink chamber 304 is circulated during a single scan of the ink-jet head which performs coloring operation.

According to the method shown in FIG. 19, the ink flow rate can be changed by adjusting the height difference between the height of the sub tank and the height of the ink exit opening of the head exiting ink to the main tank. When the residual ink in the sub tank becomes low, ink is pumped out of the main tank and supplied to the sub tank.

According to the method shown in FIG. 20, two forms are possible: arranging a pump on the ink supplying side of the head, or arranging a pump on the ink discharging side.

In the case of arranging a pump on the ink supplying side, an open-type propeller pump is used to prevent excessive force in case the path between the pump and head is clogged, thus avoiding damage. However, if the interior of the head becomes an abnormally high positive pressure, ink may leak from the head. On the contrary, in the case of arranging a pump on the ink discharging side, the interior of the head can always be kept in negative pressure, thus preventing ink leakage.

The result of coloring a color filter while circulating ink as described above is shown in FIG. 21.

Figure 21:
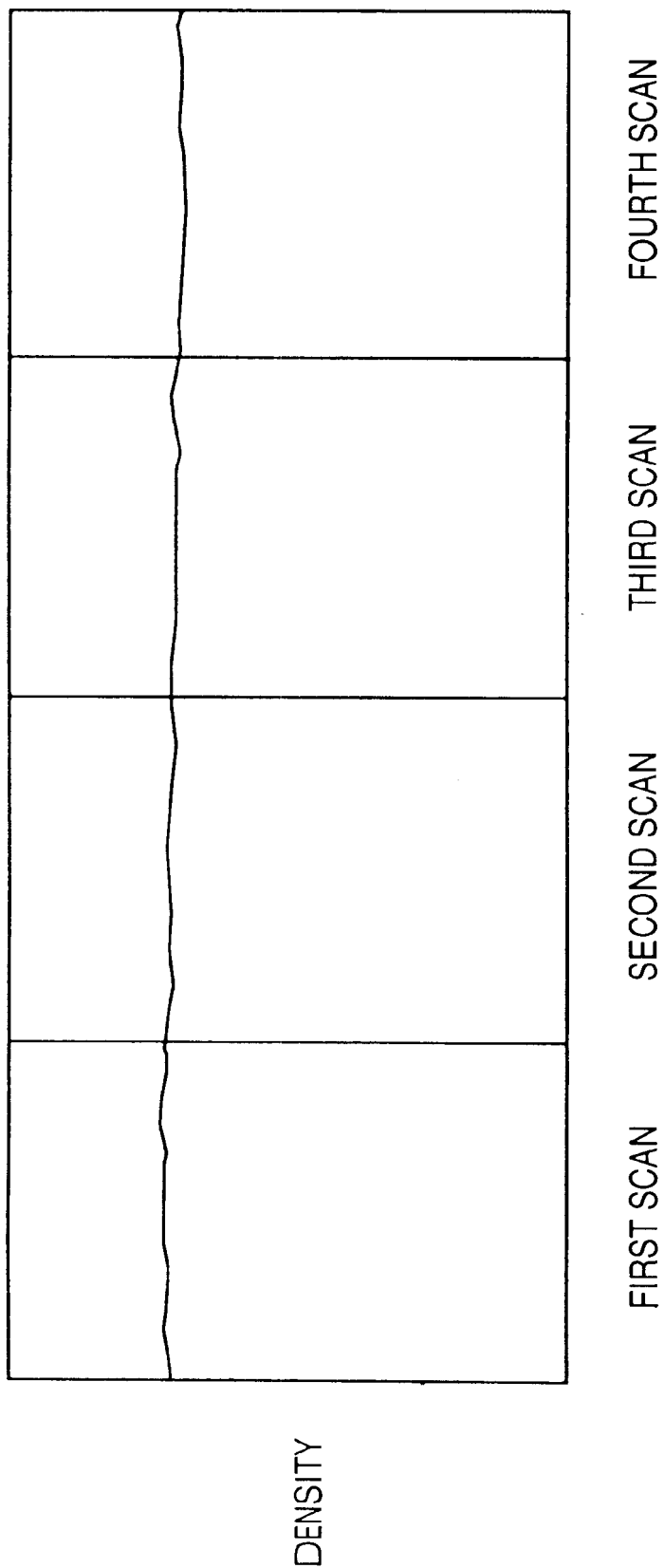
FIG. 21 is a graph demonstrating that there is no occurrence of color unevenness in a color filter after each scan.

As is apparent from FIG. 21, by virtue of circulating ink for removing residual micro bubbles or ink whose dissolved oxygen is partially increased from the ink chamber 304, the ink discharge amount does not fluctuate even if coloring operation by scanning is repeatedly performed. In addition, further experiments conducted by the inventors have found that when the head length is 1 inch or more, the ink circulation method according to the present embodiment is particularly effective. Moreover, it is preferable that the ink circulation be performed continuously even when the ink-jet head is not discharging ink.

Note that since the above-described bubble-jet type ink-jet head discharges ink by generating bubbles, bubbles are more likely to remain in the ink chamber compared to the case of employing an ink-jet head utilizing piezoelectric element. Thus, ink circulation is particularly advantageous in the bubble-jet method.

Furthermore, by virtue of utilizing the ink circulation method according to the present embodiment, the number of recovery operations and the amount of discharge by the ink-jet head are reduced, making it possible to reduce ink waste.

Next, description will be provided on how the ink circulation can prevent reduction of ink discharge amount, i.e., a method of measuring unevenness of ink discharge amount for each nozzle.

Figure 22:
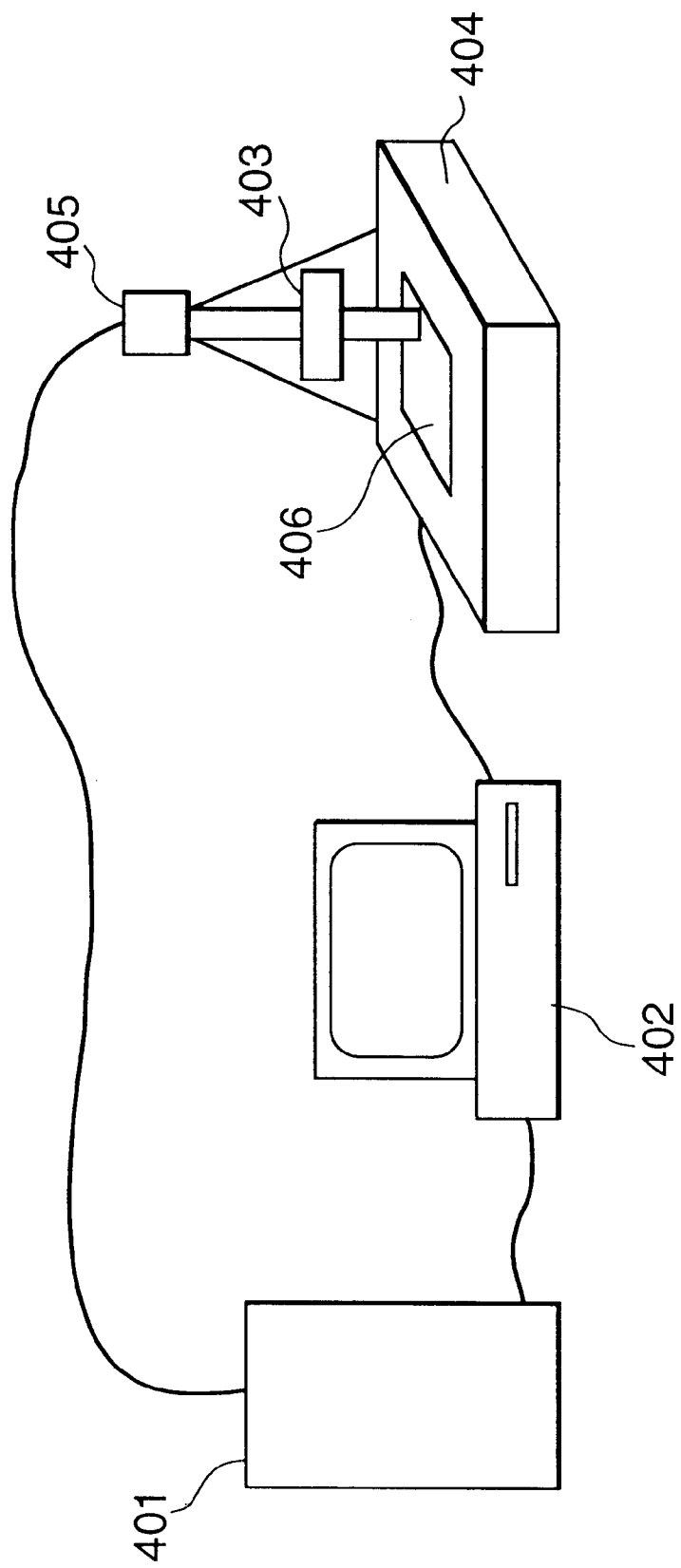
FIG. 22 is an illustrative view showing a configuration of an ink discharge amount measuring apparatus.

FIG. 22 is an illustrative view showing a configuration of an ink discharge amount measuring apparatus. In FIG. 22, reference numeral 401 denotes an image processing apparatus which measures density; 402, a personal computer (PC) which controls the image processing apparatus 401 and XY control stage 404; 403, a magnification optical system for magnifying an image; 404, an XY control stage used for consecutively measuring density of a measuring subject; 405, a line sensor camera which picks up an image of a measuring subject and sends it to the image processing apparatus 401; and 406, a light source of a transmissive light provided underneath the XY control stage 404. The central portion of the stage surface of the XY control stage 404 is made of a glass so that the measuring subject is irradiated by the light source 406 and picked up by the line sensor camera 405. Therefore, the line sensor camera 405 and light source 406 have a fixed positional relation. The PC 402 controls the XY control stage 404 through the RS 232C or GPIB (general purpose interface bus), and also controls the image processing apparatus 401.

Figure 23:
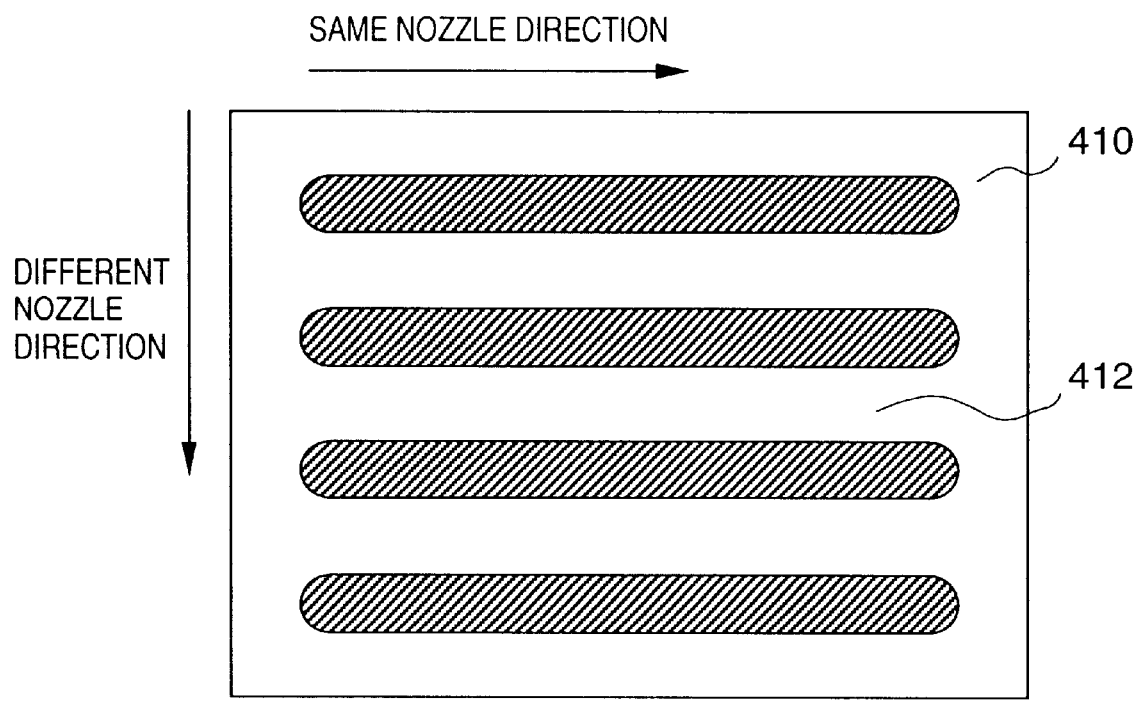
FIG. 23 shows a line pattern generated by utilizing the ink-jet head.

FIG. 23 shows a line pattern printed on a glass substrate 410 by utilizing a plurality of different nozzles of the ink-jet head. The "same nozzle direction" in FIG. 23 indicates the direction in which line patterns printed respectively by the same nozzle are extended, and the "different nozzle direction" in FIG. 23 indicates the direction in which line patterns printed by different nozzles are arranged. Note that since regular ink discharged on a plain glass substrate is repelled, it is preferable that the glass substrate 410 be subjected to special treatment for receiving ink (in the present embodiment, the glass substrate 410 is coated with polyvinyl alcohol as an ink absorptive composition layer 412). By this processing, ink discharged by each nozzle is uniformly absorbed by the composition layer 412, and a line pattern shown in FIG. 23 is formed. Needless to say, it is preferable that the composition layer 412 be as colorless and transparent as possible (which does not absorb transmitted light). Note that it is also possible to make the glass substrate not repel ink by discharging ink containing resin or the like on the glass substrate.

The magnification optical system 403 focuses on the line pattern shown in FIG. 23, and the image is picked up by the line sensor camera 405 with an appropriate setting of magnification and intensity of the light source 406, and sent to the image processing apparatus 401. Note that although the present embodiment sets the magnification to 5 times, the present embodiment is not limited to this. The line sensor camera 405 picks up monochrome images. An image picked up by the line sensor camera 405 is constructed by minimum pixel units which are the units resolvable by the image processing apparatus (in the present embodiment, A/D conversion device having 8 bits is used). The minimum pixel unit is constructed so as to be expressed in 256 (0 to 255) levels of luminance in accordance with the intensity of transmitted light at each pixel point.

Next, description will be provided on a method of measuring density of a line pattern (corresponding to the ink discharge amount of each nozzle).

In the present embodiment, density is expressed by the following equation:

$$\text{Pixel density} = \text{Log (pixel reference luminance/pixel luminance)}. \quad (1)$$

This concept is further described in detail. According to the present embodiment, density of the line pattern is determined by how much transmitted light is absorbed when the light transmits through the line pattern having a color (density) subjected to measurement. More specifically, when the density of the line pattern subjected to measurement is high, the transmitted light is absorbed and weakened. In other words, the luminance level of minimum pixels within the area of the line pattern which is subjected to measurement declines. On the contrary, when the density of the line pattern is low, the luminance level of minimum pixels within the area of the line pattern which is subjected to measurement increases. The present embodiment applies this concept, and uses the absorptivity of transmitted light as density (luminance level is obtained in the actual image processing).

Figure 24:
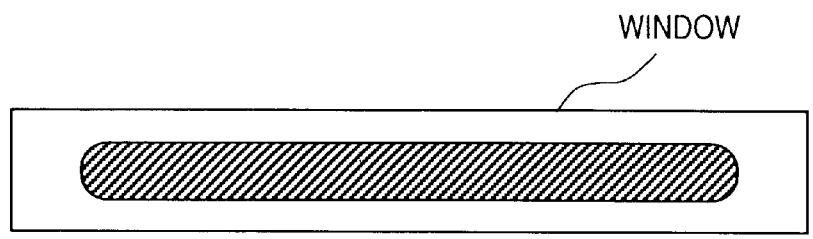
FIG. 24 shows an example in which a fixed-size window is placed on a line pattern subjected to measurement.
Figure 25:
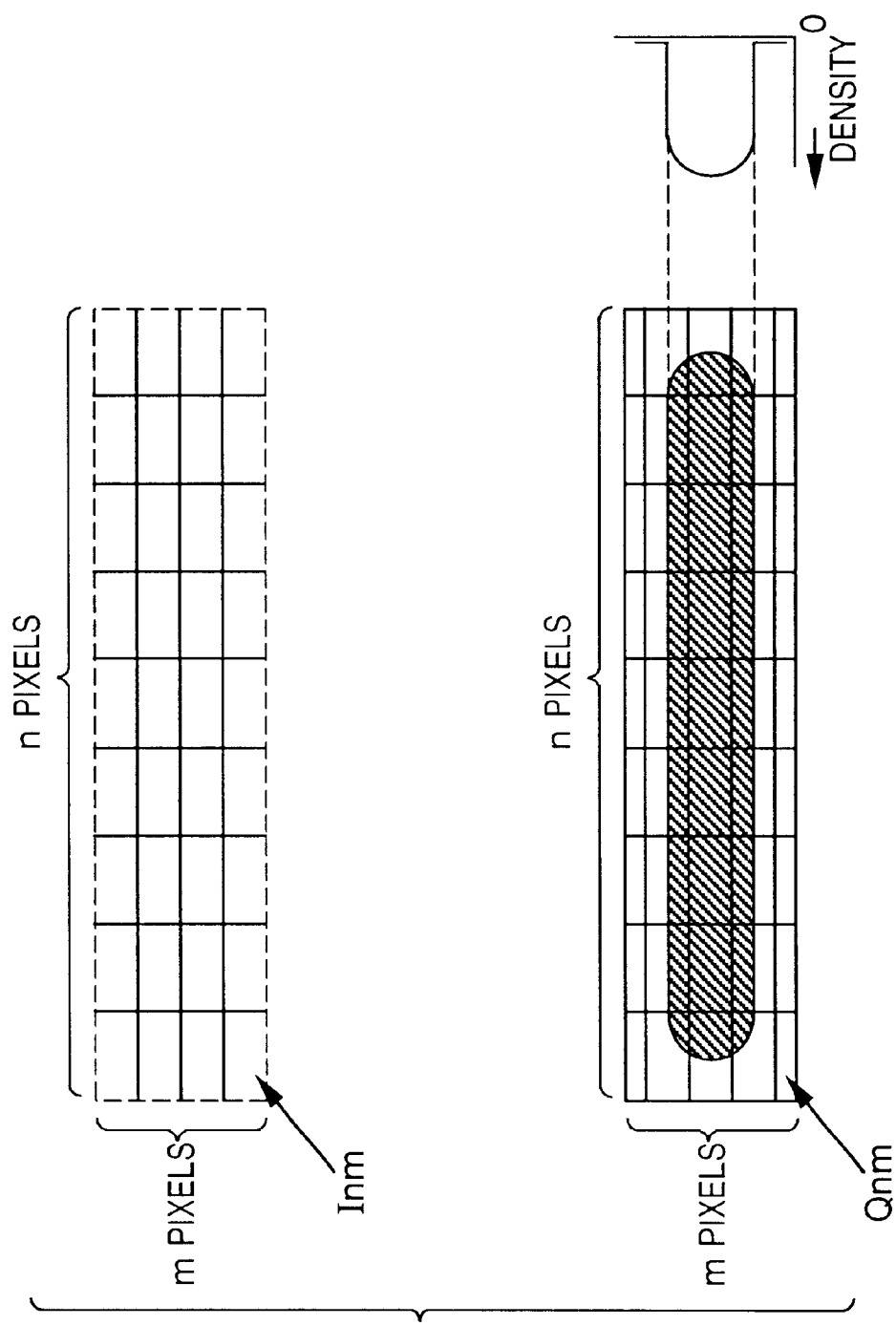
FIG. 25 shows the state in which the window is divided into each pixel.

Then, a frame (hereinafter referred to as a window) shown in FIG. 24 having a fixed size is placed on the line pattern image subjected to measurement, which has been picked up by the line sensor camera as described above. The window is constructed with n×m pixels as shown in FIG. 25 (since line sensor camera is used, the image in FIG. 25 is obtained by scanning the line pattern for m pixels in the line pattern's width direction). Herein, a luminance level of each pixel is obtained (pixel luminance: $Q_{nm}$). Then, the same size of window is placed on the portion where there is no line pattern (the glass portion), and a luminance level of each pixel is obtained (pixel reference luminance $I_{nm}$). This is represented by the window expressed by a broken line in FIG. 25. Then, with regard to each of the corresponding pixels, the following calculation is performed based on equation (1):

$$\text{Pixel density } D_{nm} = \text{Log (pixel reference luminance } I_{nm}\text{/pixel luminance } Q_{nm}) \quad \cdots (2)$$

Density for each pixel is calculated by equation (2). All the obtained pixel density $D_{nm}$ for n=1 to n and m=1 to m are summed (density of all pixels in the window is summed) to obtain the density of the entire window.

The size of the window may be appropriately determined taking into account the size of the line pattern to be measured (the size of the window must at least be larger than the entire line pattern). Assume that a window having a much larger size than the line pattern is placed. In the pixels around the line pattern where density is low (pixels corresponding to plain glass), $I_{nm} \approx Q_{nm}$ stands. If this is substituted for equation (2), the following equation (3) stands:

$$\text{Pixel density } D_{nm} = \text{Log } (I_{nm}/Q_{nm}) \approx \text{Log} 1 = 0 \quad \cdots (3)$$

More specifically, even if a window having a much larger size than the line pattern is placed, pixel density≈0 stands in the pixels around the line pattern where density is low. Even if these are summed, the pixel density for the entire window does not change much. In other words, even if a large window is placed on the line pattern, the obtained density substantially represents the density of the line pattern only. Therefore, the method according to the present embodiment can calculate correct density of the line pattern regardless of the size of the window.

The line patterns are consecutively read by controlling the XY stage 404 by the PC 402, and then by placing the window, the density of all the line patterns can be obtained.

Based on the density of the line pattern obtained in the foregoing manner, the amount of ink per single discharge of the nozzle which has printed the line pattern is obtained, with the use of a calibration line which will be described later.

Assuming that the line pattern is formed by 50 discharges of ink, the density of the line pattern obtained above is the sum of the ink dot density formed by 50 discharges of ink. In order to obtain the amount of ink per single discharge from the calibration line, the density of the line pattern is divided by the number of times of ink discharges for forming the line pattern.

In calculating the density of the line pattern, density of the entire line pattern does not have to be obtained, but, for instance, density for half the length (25 discharges) may be obtained.

Next, description will be provided on a method of obtaining a calibration line which is used as a reference when measuring the amount of ink per single discharge from a nozzle of the ink-jet head under an arbitrary condition. Herein, the amount of ink per single discharge means the amount of one ink droplet. However, since ink does not always form a droplet, the present embodiment uses the expression "the amount of ink per single discharge" instead of "droplet."

First, from among plural nozzles of an ink-jet head subjected to measurement of the ink discharge amount, the amount of discharge of at least two or more nozzles are obtained by weighting method or absorbance method. Herein, it is preferable that these at least two or more nozzles have as much difference as possible in the amount of ink per single discharge under a fixed condition.

In the present embodiment, the amount of ink per single discharge is obtained by weighting method, for four nozzles having different discharge amounts under a fixed condition.

Next, from the four nozzles whose amounts of ink per single discharge are known, ink is discharged in the same condition as the above fixed condition under which the ink discharge amount is obtained. Then, density of a line pattern (or may be ink dots) formed by the discharged ink on the glass substrate 410 is measured by the above-described method. Accordingly, the ink discharge amount of four nozzles can be obtained from the line patterns formed by the four nozzles.

Figure 26:
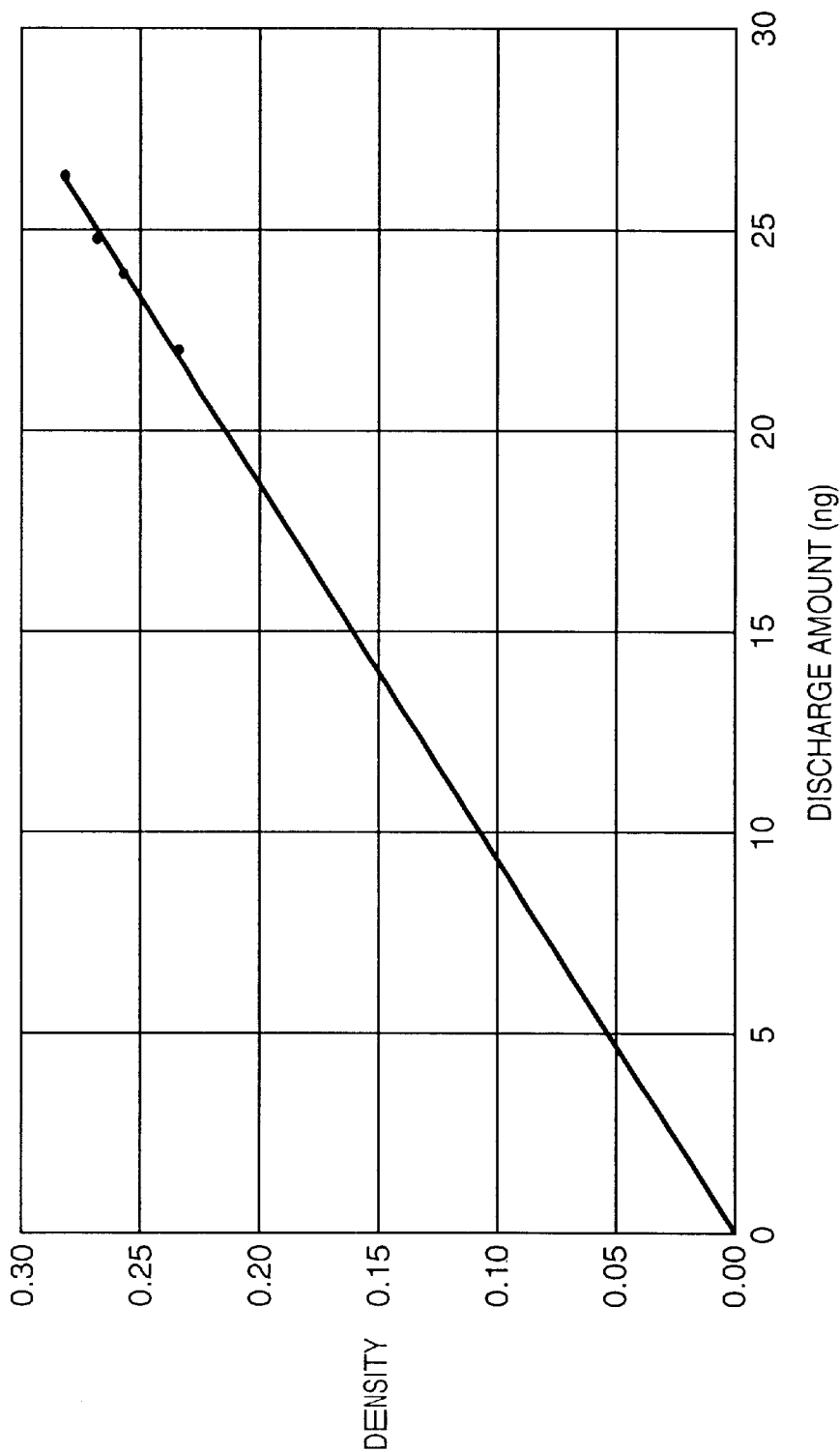
FIG. 26 shows a calibration line obtained from an experiment of the present embodiment.

FIG. 26 is a graph plotting the relation between the amount of ink per single discharge and density of an ink dot formed on the glass substrate 410 with respect to the aforementioned four nozzles. In FIG. 26, black dots indicate the ink discharge amount of four nozzles and their densities. The graph shows that the four black dots are substantially on a straight line. Therefore, by drawing a straight line which passes through the four black dots, ink-dot density corresponding to an arbitrary discharge amount can be uniquely obtained. This straight line will be referred to as a calibration line.

Since the calibration line is a straight line, a minimum of two dots on the graph are necessary to obtain the calibration line. Thus, a calibration line can be obtained with the minimum of two nozzles, instead of using four nozzles as described above. However, since the present embodiment uses the ink discharge amount data obtained by a weighting method or absorbance method to obtain a calibration line, the precision of each measurement method directly affects the precision of ink discharge amount measurement. Accordingly, it is preferable to obtain a calibration line with the use of three or more nozzles. Also, it is necessary to obtain a calibration line each time the ink to be used is changed.

Density of a line pattern formed by ink discharge of an arbitrary nozzle under an arbitrary condition is measured by the above-described method, and from the aforementioned calibration line, the ink discharge amount of the nozzle is obtained.

Note that by storing the obtained calibration line data in a memory of the PC 402, density measurement data can be instantly converted to the discharge amount data by the PC 402.

Although density measurement and calibration line calculation are performed based on the printed line pattern, the above data can be obtained also from an ink-dot pattern.

Figure 27:
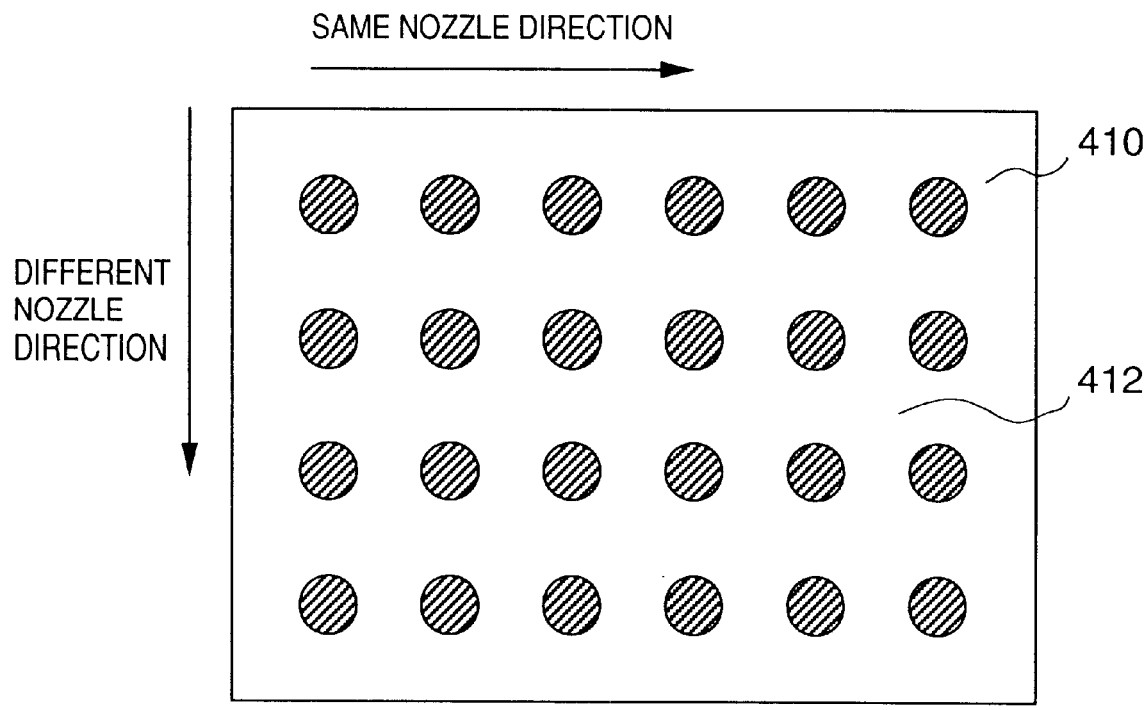
FIG. 27 shows a dot pattern generated by utilizing an ink-jet head.
Figure 28:
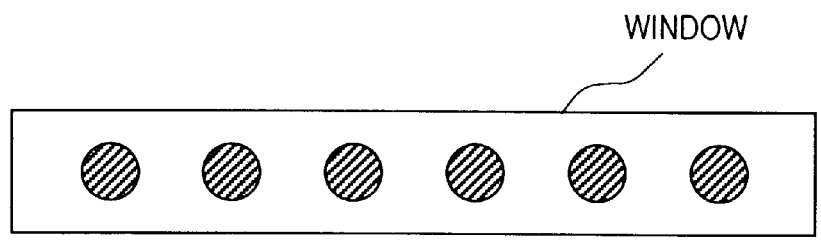
FIG. 28 shows an example in which a fixed-size window is placed on the dot pattern subjected to measurement.
Figure 29:
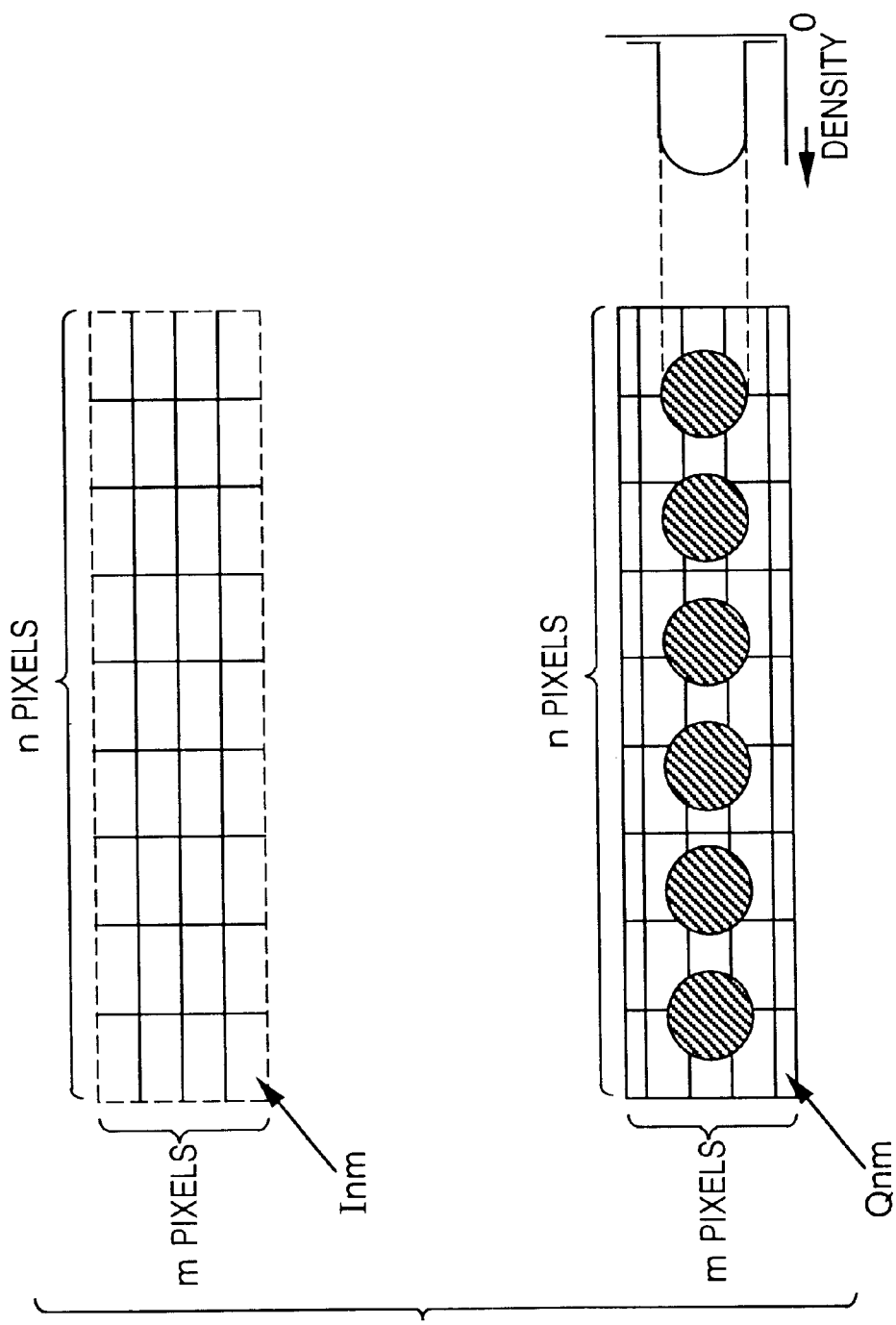
FIG. 29 shows the state in which the window is divided into each pixel.

In this case, ink dot density is measured by obtaining an average density value of 50 dots. An ink-dot pattern for density measurement is shown in FIG. 27. The above-described frame size is set as shown in FIG. 28. FIG. 29 shows an image on which the window is placed. Density detection based on the window can be realized by the method described above.

By the above-described method of measuring an ink discharge amount using a line pattern or ink-dot pattern, the amount of ink per single discharge for each nozzle of the ink-jet head 300 is measured before manufacturing a color filter. The ink discharge amount of each nozzle measured at this time is set as a normal value "1".

After manufacturing a predetermined number of color filters, the discharge amount of each nozzle is obtained again by the above-described method, and a difference with the normal value measured before manufacturing the color filter is obtained with respect to all the nozzles. Based on a value of 3σ of the difference, a magnitude of the variation rate of the difference in the discharge amount is determined.

In the present embodiment, acceptability of color filters as a result of a sensory inspection of the manufactured color filters is determined in accordance with the variation rate of the discharge amount, and the following results are obtained. Note that the sensory inspection is implemented by determining whether or not any defect is recognized by visual inspection.

According to the results, when the variation rate of the discharge amount is ±1% or less, no defect is recognized and the acceptability of the color filters as a result of sensory inspection is 100%. When the variation rate of the discharge amount is larger than ±1% and equal to or less than ±2%, the acceptability of the color filters as a result of sensory inspection is 70%. When the variation rate of the discharge amount is larger than ±2% and equal to or less than ±3%, the acceptability of the color filters as a result of sensory inspection is 20%. When the variation rate of the discharge amount is larger than ±3%, the acceptability of the color filters as a result of sensory inspection is 0%.

In view of the above results, when the fluctuation (variation rate) of the discharge amount is ±3% or less, an acceptable color filter can be manufactured, but ±2% or less is preferable, and ±1% or less is most preferable.

By virtue of circulating ink from the ink tank to the ink chamber 304 in the ink-jet head 300, the variation rate of the ink discharge amount per nozzle (discharge volume) can be kept within the aforementioned variation rate ±3% over a long period of time, even if a large number of times of ink discharge operation is repeatedly performed to manufacture a large number of color filters, and high-quality color filters can be manufactured.

Figure 30:
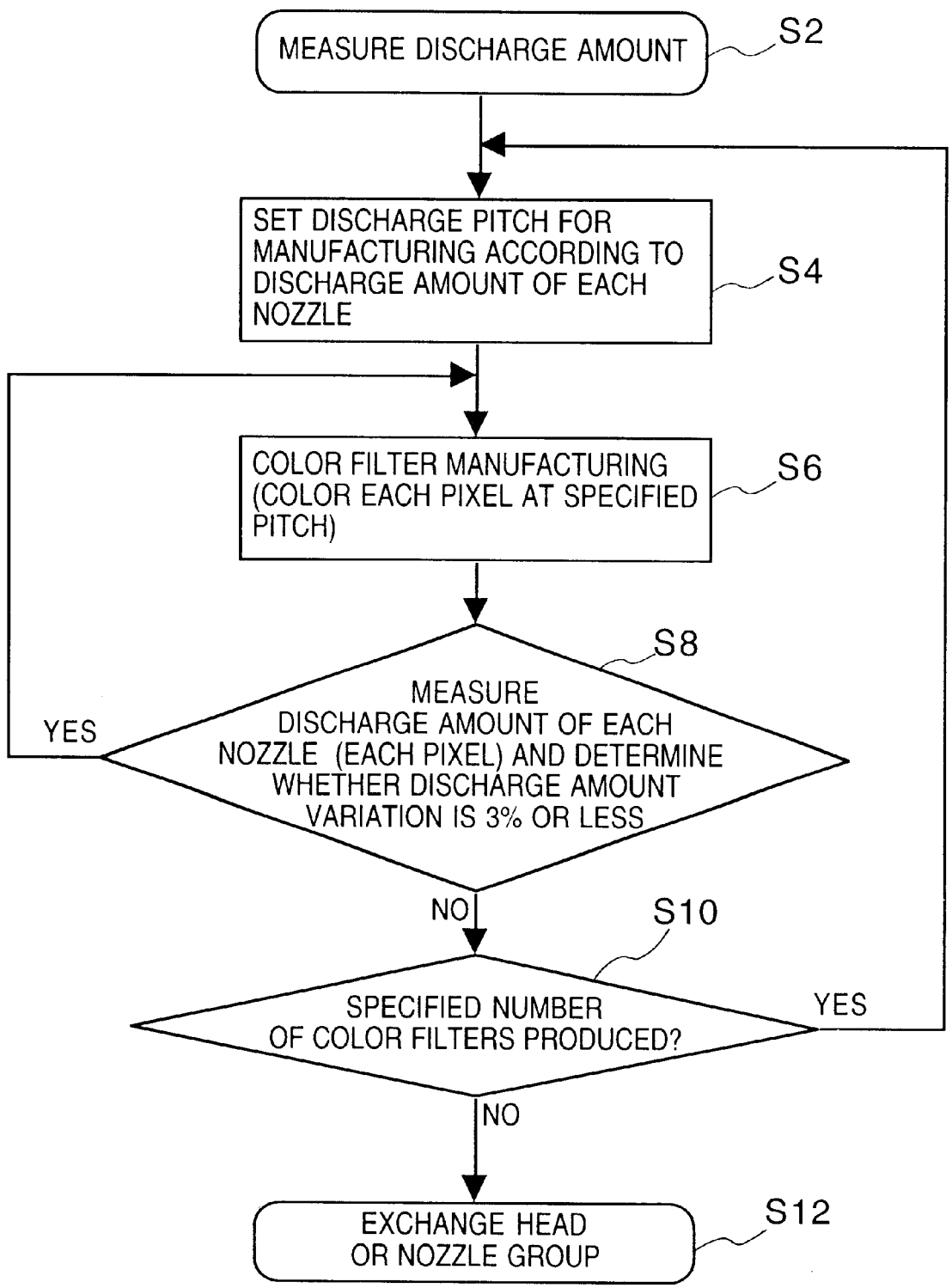
FIG. 30 is a flowchart of the entire sequence of manufacturing a color filter.

Hereinafter, an overall sequence of manufacturing a color filter according to the present embodiment is described with reference to FIG. 30.

First, before manufacturing a color filter, the amount of ink discharged from each nozzle is measured in step S2. Based on the measured ink discharge amount of each nozzle, the discharge pitch for manufacturing a color filter is calculated, and the discharge pitch is set so that the density of discharged lines (pixels of a color filter) formed by respective nozzles is uniform (step S4). In this step, the normal value of the ink discharge amount for each nozzle is specified as described above. A color filter is produced at the set pitch (step S6), then density measurement (discharge amount measurement) is performed on the measurement line which is printed periodically or on the pixels of a color filter, and it is determined whether or not the variation rate 3σ of a difference between the measured discharge amount and the discharge amount measured at the time of determining the discharge pitch for manufacturing a color filter is ±3% or less as mentioned above (step S8). If it is ±3% or less, color filter manufacturing is continued. If it is larger than ±3%, it is determined whether or not a predetermined number or more of color filters have been produced (step S10). If the produced number of color filters is less than the predetermined number, the ink-jet head is regarded as the end of the life cycle and exchanged (step S12). Meanwhile, in a case where the ink-jet head has plural nozzle groups, a nozzle group which has been used may be regarded as the end of the life cycle and exchanged with a nozzle group which has not been used. If the produced number of color filters is larger than the predetermined number, the process returns to step S4 to set print density again.

By the above sequence, coloring is performed while suppressing the variation of the discharge amount of an ink-jet head within a normal value, and excellent color filters can be produced over a long period of time.

Note that the present invention also applies to a corrected or modified version of the above-described embodiment without departing from the spirit of the present invention.

For instance, lately, a panel having a color filter on the TFT array side is available. Since the foregoing specification defines the color filter as a body to be colored with a coloring material, the color filter according to the present embodiment includes both cases of having or not having a color filter on the TFT array side.

According to the present embodiment, the variation rate of the ink discharge amount per nozzle (discharge volume)

is specified. However, when color filter pixels are colored by a plurality of nozzles, the present invention may be so set that the colored portion is formed when the variation rate of the ink discharge amount for each pixel, which is the total ink discharge amount (discharge volume) of respective nozzles coloring each pixel, is within a predetermined value, and that the discharge density is set again when the variation rate exceeds the predetermined value. In other words, a color filter itself may be measured to obtain the discharge amount for each pixel.

The embodiment described above comprises means (e.g., an electrothermal transducer, laser beam generator, and the like) for generating heat energy as energy utilized upon execution of ink discharge, and adopts a method which causes a change in state of ink by heat energy, among the ink-jet printing method. According to this printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of a so-called on-demand type and continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge orifice by growth and shrinkage of the bubble, at least one droplet is formed. If the driving signal is applied as a pulse signal, the growth and shrinkage of the bubble can be attained instantly and adequately to achieve discharge of the liquid (ink) with particularly high response characteristics.

As a pulse-form driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, an exchangeable chip type printhead which can be electrically connected to the apparatus main unit and can receive ink from the apparatus main unit upon being mounted on the apparatus main unit, or a cartridge type printhead in which an ink tank is integrally arranged on the printhead itself, is applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Moreover, in each of the above-mentioned embodiments of the present invention, it is assumed that the ink is a liquid. Alternatively, the present invention may employ ink which is solid at room temperature or less, or ink which softens or liquefies at room temperature, or ink which liquefies upon application of a printing signal.

In addition, in order to prevent a temperature rise caused by heat energy by positively utilizing it as energy for causing a change in state of the ink from a solid state to a liquid state, or to prevent evaporation of the ink, ink which is solid in a non-use state and liquefies upon heating may be used. In any case, ink which liquefies upon application of heat energy according to a printing signal and is discharged in a liquid state, ink which begins to solidify when it reaches a printing medium, or the like, is applicable to the present invention. In this case, ink may be situated opposite to electrothermal transducers while being held in a liquid or solid state in recess portions of a porous sheet or through-holes, as described in Japanese Patent Laid-Open No. 54-56847 or 60-71260. In the present invention, the above-mentioned film boiling system is most effective for the above-mentioned ink.

Furthermore, although the description has been provided on the heat energy generation means as means for discharging ink, the present invention is not limited to this, but may utilize a piezoelectric element.

As has been set forth above, according to the present invention, by generating an ink flow from the ink supply opening to the ink exiting opening in the ink chamber, variation of the ink discharge amount is suppressed, and thus a color filter with no color unevenness can be manufactured.

The present invention is not limited to the above embodiments and various changes and modifications can be made within the spirit and scope of the present invention. Therefore, to apprise the public of the scope of the present invention, the following claims are made.

What is claimed is:

1. A color filter manufacturing apparatus for forming an array of colored portions of a color filter by discharging a plurality of inks from a plurality of discharge orifices at a predetermined density by using an ink-jet head having a plurality of discharge orifices, an ink chamber connected to the plurality of discharge orifices, an ink supply opening for supplying ink to the ink chamber, and an ink exit opening for exiting ink from the ink chamber, wherein the colored portions are formed when a variation rate of ink volume discharged from the plurality of discharge orifices for forming the array of colored portions is ±3% or less, and wherein when the variation rate exceeds ±3% after ink discharge has started, the discharge density is set again.

2. The color filter manufacturing apparatus according to claim 1, wherein the colored portions are formed when a variation rate of ink volume discharged from the plurality of discharge orifices for forming the array of colored portions is ±2% or less after ink discharge has started.

3. The color filter manufacturing apparatus according to claim 2, wherein the colored portions are formed when a variation rate of ink volume discharged from the plurality of discharge orifices for forming the array of colored portions is ±1% or less after ink discharge has started.

4. The color filter manufacturing apparatus according to claim 3, wherein when the variation rate exceeds ±1% after ink discharge has started, the discharge density is set again.

5. The color filter manufacturing apparatus according to claim 2, wherein when the variation rate exceeds ±2% after ink discharge has started, the discharge density is set again.

6. The color filter manufacturing apparatus according to claim 1, wherein the variation rate is calculated based on a result of measured transmissivity of the array of colored portions formed.

7. The color filter manufacturing apparatus according to claim 6, wherein a difference in the discharge amount is obtained for all nozzles, the discharge amount being obtained based on transmissivity of an array of a line pattern or dot pattern, and wherein the variation rate is determined by $3\sigma$ of the difference.

8. The color filter manufacturing apparatus according to claim 1, comprising ink flow generating means for generating a flow of ink from the ink supply opening to the ink exit opening in the ink chamber while discharging ink from the discharge orifices for coloring.

9. The color filter manufacturing apparatus according to claim 8, wherein said ink flow generating means flows ink into the ink chamber by using a height difference between a height of the ink chamber and a height of an ink tank containing ink.

10. The color filter manufacturing apparatus according to claim 8, wherein the ink flow generating means comprises a pump for circulating ink.

11. The color filter manufacturing apparatus according to claim 10, wherein the pump is provided near the ink exit opening of the ink chamber.

12. The color filter manufacturing apparatus according to claim 1, wherein an entire area of one color filter is colored by scanning the ink-jet head plural number of times.

13. The color filter manufacturing apparatus according to claim 1, wherein said ink-jet head is a head which discharges ink by utilizing heat energy and comprises a heat energy generator for generating heat energy to be applied to the ink.

14. A color filter manufacturing method of forming an array of colored portions of a color filter by discharging a plurality of inks from a plurality of discharge orifices at a predetermined density by using an ink-jet head having a plurality of discharge orifices, an ink chamber connected to the plurality of discharge orifices, an ink supply opening for supplying ink to the ink chamber, and an ink exit opening for exiting ink from the ink chamber, wherein the colored portions are formed when a variation rate of ink volume discharged from the plurality of discharge orifices for forming the array of colored portions is ±3% or less, and wherein when the variation rate exceeds ±3% after ink discharge has started, the discharge density is set again.

15. The color filter manufacturing method according to claim 14, wherein the colored portions are formed when a variation rate of ink volume discharged from the plurality of discharge orifices for forming the array of colored portions is ±2% or less after ink discharge has started.

16. The color filter manufacturing method according to claim 15, wherein the colored portions are formed when a variation rate of ink volume discharged from the plurality of discharge orifices for forming the array of colored portions is ±1% or less after ink discharge has started.

17. The color filter manufacturing method according to claim 16, wherein when the variation rate exceeds ±1% after ink discharge has started, the discharge density is set again.

18. The color filter manufacturing method according to claim 15, wherein when the variation rate exceeds ±2% after ink discharge has started, the discharge density is set again.

19. The color filter manufacturing method according to claim 14, wherein the variation rate is calculated based on a result of measured transmissivity of the array of colored portions formed.

20. The color filter manufacturing method according to claim 19, wherein a difference in the discharge amount is obtained for all nozzles, the discharge amount being obtained based on transmissivity of an array of a line pattern or dot pattern, and wherein the variation rate is determined by $3\sigma$ of the difference.

21. The colors filter manufacturing method according to claim 14, wherein a flow of ink is generated from the ink supply opening to the ink exit opening in the ink chamber while discharging ink from the discharge orifices for coloring.

22. The color filter manufacturing method according to claim 21, wherein the flow of ink is generated by flowing ink into the ink chamber by using a height difference between a height of the ink chamber and a height of an ink tank containing ink.

23. The color filter manufacturing method according to claim 21, wherein the flow of ink is generated by a pump for circulating ink.

24. The color filter manufacturing method according to claim 23, wherein the pump is provided near the ink exit-opening of the ink chamber.

25. The color filter manufacturing method according to claim 14 wherein an entire area of one color filter is colored by scanning the ink-jet head plural number of times.

26. The color filter manufacturing method according to claim 14, wherein the ink-jet head is a head which discharges ink by utilizing heat energy and comprises a heat energy generator for generating the heat energy to be applied to the ink.

27. A method of reducing unevenness of discharge volume in a plurality of discharge nozzles by ink circulation, in a case of forming an array of colored portions of a color filter by discharging a plurality of inks from a plurality of discharge orifices at a predetermined density by using an ink-jet head having a plurality of discharge orifices, an ink chamber connected to the plurality of discharge orifices, an ink supply opening for supplying ink to the ink chamber, and an ink exit opening for exiting ink from the ink chamber, wherein a flow of ink is generated from the ink supply opening to the ink exit opening in the ink chamber while ink is discharged from the orifices for coloring, and the colored portions are formed when a variation rate of ink volume discharged from the plurality of discharge orifices for forming the array of colored portion is ±3% or less, and wherein when the variation rate exceeds ±3% after ink discharge has started, the discharge density is set again.

28. The method of reducing unevenness of discharge volume in a plurality of discharge nozzles by ink circulation according to claim 27, wherein the colored portions are formed when a variation rate of ink volume discharged from the plurality of discharge orifices for forming the array of colored portions is ±2% or less after ink discharge has started.

29. The method of reducing unevenness of discharge volume in a plurality of discharge nozzles by ink circulation according to claim 28, wherein the colored portions are formed when a variation rate of ink volume discharged from the plurality of discharge orifices for forming the array of colored portions is ±1% or less after ink discharge has started.

30. The method of reducing unevenness of discharge volume in a plurality of discharge nozzles by ink circulation according to claim 29, wherein when the variation rate exceeds ±1% after ink discharge has started, the discharge density is set again.

31. The method of reducing unevenness of discharge volume in a plurality of discharge nozzles by ink circulation according to claim 28, wherein when the variation rate exceeds ±2% after ink discharge has started, the discharge density is set again.

* * * * *

UNITED STATES PATENT AND TRADEMARK OFFICE
CERTIFICATE OF CORRECTION

PATENT NO.    : 6,540,346 B1
DATED         : April 1, 2003
INVENTOR(S)   : Akahira et al.

It is certified that error appears in the above-identified patent and that said Letters Patent is hereby corrected as shown below:

<u>Title page,</u>
Item [56], References Cited, FOREIGN PATENT DOCUMENTS,
"JP    09236490    *    9/1997" should read
-- JP    9-236490    *    9/1997 --.

<u>Column 22,</u>
Line 39, "claim 14" should read -- claim 14, --.

Signed and Sealed this

Eighteenth Day of November, 2003

JAMES E. ROGAN
*Director of the United States Patent and Trademark Office*